(12) United States Patent
O'Malley

(10) Patent No.: US 11,925,917 B2
(45) Date of Patent: Mar. 12, 2024

(54) SCALABLE PREPARATION OF OXYGEN CARRIERS FOR CHEMICAL LOOPING

(71) Applicant: Kyle O'Malley, Albuquerque, NM (US)

(72) Inventor: Kyle O'Malley, Albuquerque, NM (US)

(*) Notice: Subject to any disclaimer, the term of this patent is extended or adjusted under 35 U.S.C. 154(b) by 0 days.

(21) Appl. No.: 17/402,342

(22) Filed: Aug. 13, 2021

(65) Prior Publication Data

US 2022/0048007 A1 Feb. 17, 2022

Related U.S. Application Data

(60) Provisional application No. 63/065,264, filed on Aug. 13, 2020.

(51) Int. Cl.
| | |
|---|---|
| *B01J 20/02* | (2006.01) |
| *B01J 20/10* | (2006.01) |
| *B01J 20/22* | (2006.01) |
| *B01J 20/28* | (2006.01) |
| *F23C 99/00* | (2006.01) |

(52) U.S. Cl.
CPC ....... *B01J 20/0237* (2013.01); *B01J 20/0225* (2013.01); *B01J 20/103* (2013.01); *B01J 20/223* (2013.01); *B01J 20/28069* (2013.01); *F23C 99/00* (2013.01); *B01J 2220/42* (2013.01); *B01J 2220/46* (2013.01); *F23C 2900/99008* (2013.01)

(58) Field of Classification Search
CPC .... B01J 20/02; B01J 20/0237; B01J 20/0225; B01J 20/103; B01J 20/223; B01J 20/28069; B01J 2220/42; B01J 2220/46; F23C 99/00; F23C 2900/99008
USPC ......................................................... 502/401
See application file for complete search history.

(56) References Cited

U.S. PATENT DOCUMENTS

| | | | |
|---|---|---|---|
| 9,346,013 B2 | 5/2016 | Moghtaderi et al. | |
| 2019/0233751 A1* | 8/2019 | Medoff .................... | C10G 3/47 |

FOREIGN PATENT DOCUMENTS

WO    WO-2020049462 A1 *   3/2020   .............. B01J 21/04

OTHER PUBLICATIONS

Abad, A. , et al., "Kinetics of CaMnO.775Ti0.125M-g0.102.9-δ perovskite prepared at industrial scale and its implication on the performance of chemical looping combustion of methane", Chem. Eng. J., vol. 394, 2020, 124863.
Adanez, J. , et al., "Chemical looping combustion of solid fuels", Prog. Energy Combust. Sci., vol. 65, 2018, 6-66.
Adanez, J. , et al., "Selection of Oxygen Carriers for Chemical-Looping Combustion", Energy Fuels, vol. 18, No. 3, 2004, 371-377.
Adanez-Rubio, I. , et al., "Development of Cu-based oxygen carriers for Chemical-Looping with Oxygen Uncoupling (CLOU) process", Fuel, vol. 102, 2012, 634-645.
Adanez-Rubio, I. , et al., "Development of CuO-based oxgen-carrier materials suitable for Chemical-Looping with Oxygen Uncoupling (CLOU) process", Energy Procedia, vol. 4, 2011, 417-424.
Cabello, A. , et al., "Long-lasting Cu-based oxygen carrier material for industrial scale in Chemical Looping Combustion", Int. J. Greenhouse Gas Control, vol. 52, 2016, 120-129.
Cormos, C. , "Assessment of copper-based chemical looping air separation system for energy efficiency improvements of oxy-combustion and gasification power plants", Appl. Therm. Eng., vol. 130, 2018, 120-126.
Costa, T. R., et al., "Mn-based oxygen carriers prepared by impregnation for Chemical Looping Combustion with diverse fuels", Fuel Process. Technol., vol. 178, 2018, 236-250.
De Diego, L. F., et al., "Development of Cu-based oxygen carriers for chemical-looping combustion", Fuel, vol. 83, No. 13, 2004, 1749-1757.
De Diego, L. F., et al., "Impregnated CuO/Al2O3 Oxygen Carriers for Chemical-Looping Combustion: Avoiding Fluidized Bed Agglomeration", Energy Fuels, vol. 19, 2005, 1850-1856.
De Diego, L. F., et al., "Operation of a 10 kWth chemical-looping combustor during 200 h with a CuO—Al2O3 carrier", Fuel, vol. 86, Nos. 7-8, 2007, 1036-1045.
Ding, K. , et al., "A general synthesis approach for supported bimetallic nanoparticles via surface inorganometallic chemistry", Science, vol. 362, Washington D.C., 2018, 560-564.
Eia , "International Energy Outlook 2017", No. IEO2017, U.S. Energy Information Administration, Sep. 14, 2017, 63.
Fang, H. , et al., "Advancements in development of chemical-looping combustion: A review", Int. J. Chem. Eng, vol. 2009, 2009, 710515.
Friedlingstein, P. , et al., "Global Carbon Budget 2019", Earth Syst. Sci. Data, vol. 11, No. 4, 2019, 1783-1838.
Goldstein, E. A., et al., "Modeling defect transport during Cu oxidation", Corros. Sci., vol. 99, 2015, 53-65.
Hakonsen, S. F., et al., "Chemical Looping Combustion in a Rotating Bed Reactor—Finding Optimal Process Conditions for Prototype Reactor", Environ. Sci. Technol., vol. 45, No. 22, 2011, 9619-9626.
Han, L. , et al., "Chemical-looping combustion in a reverse-flow fixed bed reactor", Energy, vol. 102, 2016, 669-681.
Haus, J. , et al., "Analysis of a Two-Stage Fuel Reactor System for the Chemical-Looping Combustion of Lignite and Bituminous Coal", Energy Technol., vol. 4, 2016, 1263-1273.
Haus, J. , et al., "Dynamic flowsheet simulation for chemical looping combustion of methane", Int. J. Greenhouse Gas Control, vol. 72, 2018, 26-37.

(Continued)

*Primary Examiner* — Edward M Johnson
(74) *Attorney, Agent, or Firm* — Philip D. Askenazy; Peacock Law P.C.

(57) ABSTRACT

Wet impregnation of active metal precursors into porous substrates, together with selective adsorption of the precursors on the pore surfaces, enables transition metal oxides derived from the precursors to disperse throughout the substrate, even at the nanoscale, without increased sintering or agglomeration, thereby forming oxygen carriers suitable for chemical looping. The porous substrate can be an oxide, for example $SiO_2$. The oxygen carriers can comprise relatively large oxide loadings of over about 20 wt % and exhibit high reactivity over many regeneration cycles with substantially no loss in oxygen transport capacity or decrease in kinetics. The use of multiple transition metal oxides, for example NiO in addition to CuO, can greatly enhance chemical looping performance.

15 Claims, 15 Drawing Sheets

(56) References Cited

OTHER PUBLICATIONS

Herzog, H., et al., "Carbon Capture and Storage from Fossil Fuel Use", Encycl. Energy, 2004, 277-287.
Iloeje, C. O., et al., "Design and techno-economic optimization of a rotary chemical looping combustion power plant with CO2 capture", Appl. Energy, vol. 231, 2018, 1179-1190.
Imtiaz, Q., et al., "Review of Oxygen Carriers for Chemical Looping with Oxygen Uncoupling (CLOU): Thermodynamics, Material Development, and Synthesis", Energy Technol., vol. 1, No. 11, 2013, 633-647.
Ku, Y., et al., "Chemical looping with air separation (CLAS) in a moving bed reactor with CuO/ZrO 2 oxygen carriers", Int. J. Greenhouse Gas Control, vol. 70, 2018, 225-235.
Lambert, A., et al., "Performance and degradation mechanisms of CLC particles produced by industrial methods", Fuel, vol. 216, 2018, 71-82.
Lambert, J.-F., et al., "Phenomena at the Oxide/Water Interface: the interplay of surface charge formation, metal complex, adsorption, and dissolution/reprecipitation", Stud. Surf. Scie Catal., vol. 109, 1997, 91-110.
Langorgen, O., et al., "Chemical looping combustion of methane using a copper-based oxygen carrier in a 150 kW reactor system", Energy Procedia, vol. 114, No. 1876, 2017, 352-360.
Larring, Y., et al., "Fabrication process parameters significantly affect the perovskite oxygen carriers material (OCM) performance in chemical looping with oxygen uncoupling (CLOU)", J. Therm. Anal. Calorim, vol. 140, No. 2, 2020, 577-589.
Linderholm, C., et al., "Chemical-looping combustion of solid fuels—Operation in a 10 kW unit with two fuels, above-bed and in-bed fuel feed and two oxygen carriers, managanese ore and ilmenite", Fuel, vol. 102, 2012, 808-822.
Lyngfelt, A., et al., "1000 MW th boiler for chemical-looping combustion of solid fuels—Discussion of design and costs", Appl. Energy, vol. 157, 2015, 475-487.
Mattisson, T., et al., "Chemical-looping with oxygen uncoupling for combustion of solid fuels", Int. J. Greenhouse Gas Control, vol. 3, No. 1, 2009, 11-19.
Munnick, P., et al., "Recent Developments in the Synthesis of Supported Catalysts", Chem. Rev., vol. 115, No. 14, 2015, 6687-6718.
Noorman, S., et al., "Experimental Investigation of Chemical-Looping Combustion in Packed Beds: A Parametric Study", Ind. Eng. Chem. Res., vol. 50, 2011, 1968-1980.
Pachler, R. F., et al., "Fate of sulfur in chemical looping combustion of gaseous fuels using a Perovskite oxygen carrier", Fuel, vol. 241, 2019, 432-441.
Penthor, S., et al., "Investigation of the performance of a copper based oxygen carrier for chemical looping combustion in a 120 kW pilot plant for gaseous fuels", Appl. Energy, vol. 145, 2015, 52-29.
Peterson, S. B., et al., "Characteristics and CLOU performance of a novel SiO2-supported oxygen carrier prepared from CuO and β-SiC", Energy Fuels, vol. 27, No. 10, 2013, 6040-6047.
Ryden, M., et al., "CuO-Based Oxygen-Carrier Particles for Chemical-Looping with Oxygen Uncoupling—Experiments in Batch Reactor and in Continous Operation", Ind. Eng. Chem. Res., vol. 53, 2014, 6255-6267.
Sandvik, P., et al., "Operating Strategy of Chemical Looping Systems with Varied Reducer and Combustor Pressures", Ind. Eng. Chem. Res., vol. 58, 2019, 5228-5235.
Siriwardane, R., et al., "50-kWth methane/air chemical looping combustion tests with commercially prepared CuO—Fe 2 O 3-alumina oxygen carrier with two different techniques", Appl. Energy, vol. 213, 2018, 92-99.
Song, Q., et al., "A high performance oxygen storage material for chemical looping processes with CO2 capture", Energy Environ. Sci., vol. 6, 2013, 288-298.
Song, H., et al., "Analysis on Chemical Reaction Kinetics of CuO/SiO2 Oxygen Carriers for Chemical Looping Air Separation", Energy Fuels, vol. 28, 2014, 173-182.
Strohle, J., et al., "Chemical looping combustion of hard coal in a 1 MW th pilot plant using ilmenite as oxygen carrier", Appl. Energy, vol. 157, 2015, 288-294.
Tian, W., et al., "Using a hierarchically-structured CuO@TiO2—Al2O3 oxygen carrier for chemical looping air separation in a paralleled fluidized bed reactor", Chem. Eng. J, vol. 334, 2018, 611-618.
Tong, A., et al., "Iron-based syngas chemical looping process and coal-direct chemical looping process development at Ohio State University", Appl. Energy, vol. 113, 2014, 1836-1845.
Toupance, T., et al., "Conditions of formation of copper phyllosilicates in silica-supported copper catalysts prepared by selective adsorption", J. Phys. Chem. B, vol. 106, No. 9, 2002, 2277-2286.
Toupance, T., et al., "Metal Particle Size in Silica-Supported Copper Catalysts. Influence of the Conditions of Preparation and of Thermal Pretreatments", J. Phys. Chem. B, vol. 104, No. 5, 2000, 965-972.
Wang, H., et al., "The Effect of the Support Structure and Size of Cu-based Oxygen Carriers on the Performance of Chemical Looping Air Separation", Aerosol Air Qual. Res., vol. 20, 2020, 544-556.
Wong, A., et al., "Synthesis of ultrasmall, homogeneously alloyed, bimetallic nanoparticles on silica supports", Science, vol. 358, No. 6369, Washington, D.C., 2017, 1427-1430.
Zhao, Z., et al., "Design of a rotary reactor for chemical-looping combustion. Part 1: Fundamentals and design methodology", Fuel, vol. 121, 2014, 327-343.
Zhou, C., et al., "Integration Options and Economic Analysis of an Integrated Chemical Looping Air Separation Process for Oxy-fuel Combustion", Energy Fuels, vol. 30, 2016, 1741-1755.
Gayan, Pilar, et al., "Development of Cu-based oxygen carriers for Chemical-Looping with Oxgen Uncoupling (CLOU) process", Fuel, vol. 96, 2012, 226-238.
Zhu, Y., et al., "Brief review of oxidation kinetics of copper at 350C to 1050C", Metall. Mater. Trans. A, vol. 37, No. 4, 2006, 1231-1237.
Zhu, X., et al., "Charge-enhanced dry impregnation: A simple way to improve the preparation of supported metal catalysts", ACS Catal., vol. 3, No. 4, 2013, 625-630.
Zhu, Y., et al., "Influence of Small Amounts of Impurities on Copper Oxidation at 600-1050° C.", Oxid. Met., vol. 59, 2003, 575-590.
Zhu, Y., et al., "Oxidation Mechanism of Cu2O to CuO at 600-1050° C.", Oxid. Met., vol. 62, 2004, 207-222.
Jerndal, Erik, et al., "Investigation of NiO/NiAl2O4 oxygen carriers for chemical-looping combustion produced by spray-drying", International Journal of Greenhouse Gas Control, vol. 4, 2010, 23-35.

\* cited by examiner

SCALABLE PREPARATION OF OXYGEN CARRIERS FOR CHEMICAL LOOPING

CROSS-REFERENCE TO RELATED APPLICATIONS

This application claims priority to and the benefit of the filing of U.S. Provisional Patent Application No. 63/065,264, entitled "Scalable Preparation Of Bimetallic Cu/Ni-Based Oxygen Carriers For Chemical Looping", filed on Aug. 13, 2020, the entirety of which is incorporated herein by reference.

STATEMENT REGARDING FEDERALLY SPONSORED RESEARCH OR DEVELOPMENT

This invention was made with government support under Contract No. DE-FE0025076 awarded by the Department of Energy. The government has certain rights in the invention.

BACKGROUND OF THE INVENTION

Field of the Invention (Technical Field)

The present invention is related to chemical looping, a combustion technology utilizing the cyclic oxidation and reduction of a metal oxide to transport oxygen for a variety of applications related to carbon capture and storage (CCS), particularly the preparation of CuO and bimetallic CuO/NiO on SiC and $SiO_2$ substrates for chemical looping with oxygen uncoupling (CLOU) applications.

Background Art

Note that the following discussion may refer to a number of publications and references. Discussion of such publications herein is given for more complete background of the scientific principles and is not to be construed as an admission that such publications are prior art for patentability determination purposes.

CCS has been proposed to capture $CO_2$ emissions from fossil fuel combustion, enabling power generation without contributing to anthropogenic climate change. In 2018, fossil fuel combustion constituted over 86% of global carbon emissions, including 35% alone attributed to coal combustion for power generation. The Energy Information Administration projects global coal use to remain steady over the next 20 years. CCS technologies allow the capture and long-term storage of $CO_2$ and the mitigation of undesirable climate impacts. The technologies include pre-combustion, post-combustion, and oxy-fuel combustion, which have been extensively reviewed. Each technology produces a concentrated stream of $CO_2$ ready for sequestration. Oxy-fuel technologies operate by separating oxygen in air from $N_2$ prior to combustion, thus reducing the cost and complexity of isolating $CO_2$. Chemical looping combustion (CLC) is considered an oxy-fuel technology in which the fuel is oxidized by reaction with a solid metal oxide oxygen carrier. Chemical looping with oxygen uncoupling (CLOU) is an innovation to conventional CLC adapted for solid fuel processing. All CLOU materials are also capable of operating as oxygen carriers in chemical looping with air separation (CLAS) for any oxy-fuel application. Compared to oxy-fuel technologies that utilize cryogenic air separation, chemical looping has a far lower energy penalty.

FIG. 1 illustrates the CLOU process, with CuO as an exemplary metal oxide oxygen carrier (OC) entering the fuel reactor, initially at a fully oxidized state. Decomposition to $Cu_2O$ and release of gaseous $O_2$ occurs spontaneously in the low $O_2$ partial pressure environment of the fuel reactor. Gaseous $O_2$ reacts quickly with the solid carbonaceous fuel relative to in-situ gasification CLC, which requires that the fuel be first gasified to produce CO and $H_2$ that then react with lattice oxygen on the OC. Large scale chemical looping demonstrations have been limited to this method, typically performed with the Fe—Ti-based oxide ilmenite. In the CLOU process, the $Cu_2O$ in the OC is re-oxidized to CuO in the air reactor. Suitable monometallic metal oxides for CLOU are limited to $Mn_2O_3$, $Co_3O_4$, and CuO, which exhibit favorable thermodynamic characteristics in the narrow range of combustion temperatures (typically about 700-950° C.).

One of the more significant challenges to chemical looping processing of solid fuels is the manufacture of a suitable OC bed material. Candidates tend to have tradeoffs among reactivity, degradation resistance (due to agglomeration or attrition), and cost. For example, Mn ore is an inexpensive OC for CLOU applications, but it suffers from high attrition rate. Other research has shown deactivation of Mn-based materials prepared by impregnation, which was attributed to incomplete oxidation. Promising results have been reported for in-situ gasification CLC with solid fuels using ilmenite as the OC. However, the Fe—Ti ore has been shown to have low conversion rate, as well as rapid loss of oxygen-carrying capacity due to Fe migration to the external surface and attrition. Ca—Mn based perovskites with doping (Mg, Ti) are promising candidates as well, with good stability and reaction rate which has been shown to increase with cycle. The drawbacks of these perovskites are deactivation from sulfur impurities and low oxygen transport capacities of <0.01 g $O_2$/g OC.

The use of CuO is advantageous due to the following qualities: high oxygen transport capacity (OTC) of 0.1 g $O_2$/g CuO in accordance with Equation (1), thus requiring lower solid transport rates; high reactivity, also reducing solids inventory; exothermic air and fuel reactors for various types of fuel, unique to CuO; CuO reduction is favored thermodynamically to completely convert gaseous hydrocarbons; and low cost relative to other active CLC metals.

$$4CuO \leftrightarrow 2Cu_2O + O_2 \quad (1)$$

The decomposition and oxidation reactions for CuO as a CLOU carrier are shown in Equation (1) as the forward and reverse reactions, respectively. The chief disadvantage for copper oxide is the low melting point, as shown in Table 1. The Tammann temperature (half the melting temperature on an absolute basis) indicates the temperature at which materials begin to sinter. Sintering and agglomeration risk damaging process equipment and reduced reaction rate. In particular, complete reduction to elemental Cu at operating temperatures around 950° C. poses high risk. Attrition also degrades the OC particle and reduces oxygen transport. Due to these risks, Cu-based OCs must be synthesized on a stabilizing support. In order for chemical looping technologies to be successful long-term, the synthesized oxygen carrier must be resistant to sintering and attrition over thousands of reaction cycles. Operation is limited to circulating fluidized beds due to the copper sintering challenge. Synthesized CuO OCs with improved resistance to sintering would allow for more flexible and cost-effective designs such as moving beds, rotary reactors, and fixed (packed) beds.

TABLE 1

Melting points and sintering temperatures for copper and its oxides

| Material | Tammann Temperature (° C.) | Melting Point (° C.) |
|---|---|---|
| Cu | 405 | 1085 |
| $Cu_2O$ | 481 | 1230 |
| CuO | 526 | 1330 |

Scale-up of Cu-based oxygen carriers has focused on impregnation and mechanical mixing followed by spray drying. OCs prepared via impregnation have high reactivity over many cycles and high mechanical strength but have demonstrated agglomeration problems at high CuO content. Fluidized bed testing at 800° C., with reduction in 25 vol % $CH_4$ and oxidation in 8 vol % $O_2$ atmosphere, showed agglomeration of Cu-based OCs on γ-$Al_2O_3$ with loadings >17 wt % CuO. Pilot-scale demonstrations of industrially available <15 wt % CuO content material have been performed in 0.5, 10, 25, 120, and 150 kW beds. The loss of oxygen transport capacity due to sintering or attrition is an ongoing challenge, with observations of over a 35% drop in OTC. Carriers with high CuO content (40-60 wt %) have been demonstrated using freeze granulation and mechanical mixing with granulation or spray drying. These OCs exhibited low mechanical strength in fluidized-bed testing, and subsequent bed loss. To prevent bed loss through elutriation in fluidized beds, increasing particle size to the range of 200-600 m has been suggested. Cu-based OCs have shown promising results in moving and fixed beds, which exhibit less mechanical stress than fluidized beds.

To increase the CuO loading, methods such as self-assembly template combustion synthesis and impregnation on nanoscale inert supports have recently been developed. One of the key challenges of Cu sintering stems from poor dispersion of the active metal across the support; conventional impregnation and mechanical mixing techniques do not stabilize CuO to the support sufficiently. In order to achieve mixing at the molecular level, CuO@$Al_2O_3$ layered double hydroxides by co-precipitation were prepared. Fluidization experiments of material with 60 wt % CuO loading showed minimal sintering and no agglomeration over 121 redox cycles. The results suggest that improved CuO dispersion leads to less sintering.

One challenge to scaling up oxygen carrier production via impregnation is maintaining a high resistance to agglomeration. 40 wt % CuO content on $SiO_2$ that did not agglomerate in 0.5 kW reactor testing has been reported; however, an extended heat treatment step at 980° C. was required, which is not feasible in certain situations. Without this high temperature calcination step, good dispersion is crucial to preventing agglomeration. One consideration for preventing poor dispersion on the external surface is precursor migration during the drying stage. When the porous particle is heated externally, the precursor evaporates at the surface and capillary forces promote solution migration out of the porous matrix. One approach to address this is microwave drying, which heats the particles uniformly throughout the internal matrix.

For impregnation methods, dispersion can also be improved by increasing the affinity of Cu cations to the support surface by careful selection of the Cu precursor. The rational synthesis method known as strong electrostatic adsorption, or simply selective adsorption (SA), has been demonstrated to evenly deposit small CuO particles on a variety of substrates. The SA method exploits tunable surface hydroxyl groups (OH) on the metal oxide surface; when the pH is greater than the point-of-zero charge (PZC), the hydroxyl groups are deprotonated and the surface becomes negatively charged, as shown in FIG. 2. Conversely, when the pH is less than the PZC, anionic metal species is preferentially attracted. The Cu metal cation is attracted to the surface by nonspecific, Coulombic, and electrostatic forces. Tetraammine copper nitrate precursor has been used previously for impregnation on $SiO_2$, a cationic adsorbent with a PZC of 2.

Sintering typically reduces reactivity, in particular re-oxidation after complete reduction to elemental Cu. Non-porous $Cu_2O$ scales oxidize very slowly through outward diffusion of Cu atoms. To increase the conversion rate in this regime, metallic impurities such as Ni have been added to lower the copper purity to 99.5 wt %. The rate was observed to increase due to increased grain boundary diffusion as a result of smaller grain size. Modeling work suggests the copper sub-particle size must be <1 for the $Cu_2O$-to-CuO oxidation rate to be sufficiently fast for chemical looping applications.

SUMMARY OF THE INVENTION
(DISCLOSURE OF THE INVENTION)

An embodiment of the present invention is a method for making a chemical looping oxygen carrier, the method comprising wet impregnating a porous substrate with one or more active metal precursors; selectively adsorbing the one or more active metal precursors onto a porous substrate; and thermally converting the one or more active metal precursors to one or more metal oxides. The one or more metal oxides are present in the oxygen carrier in an amount preferably greater than approximately 20 wt %, more preferably greater than or equal to approximately 33 wt %, and even more preferably greater than approximately 40 wt %. The one or more active metal precursors preferably comprise ammonia. When the one or more active metals comprise transition metals, the ammonia preferably creates a transition metal coordination complex for each oxygen carrier. The transition metal coordination complexes preferably comprises an ammine or a chlorine complex. One of the one or more transition metals preferably comprises CuO and the corresponding transition metal coordination complex preferably comprises tetraammine copper nitrate (TACN). One of the one or more transition metals optionally comprises NiO and the corresponding transition metal coordination complex preferably comprises hexaammine (HANN). The method preferably comprises approximately uniformly dispersing each metal oxide on the porous substrate and within the pores of the porous substrate. The porous substrate preferably comprises an oxide, for example $Al_2O_3$, $TiO_2$, or $ZrO_2$, and is preferably macroporous, mesoporous, microporous, or nanoporous.

Another embodiment of the present invention is an oxygen carrier for chemical looping, the oxygen carrier comprising a porous substrate and one or more metal oxides each approximately uniformly dispersed on the porous substrate and within the pores of the porous substrate. The one or more metal oxides are present in the oxygen carrier in an amount preferably greater than approximately 20 wt %, more preferably greater than or equal to approximately 33 wt %, and even more preferably greater than approximately 40 wt %. The one or more metal oxides preferably comprise transition metal oxides. One of the one or more transition metal oxides preferably comprises CuO. One of the one or more transition metal oxides optionally comprises NiO. The porous substrate preferably comprises an oxide such as $Al_2O_3$, $TiO_2$, or $ZrO_2$ and is preferably macroporous, mesoporous, microporous, or nanoporous.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

Figure 1:
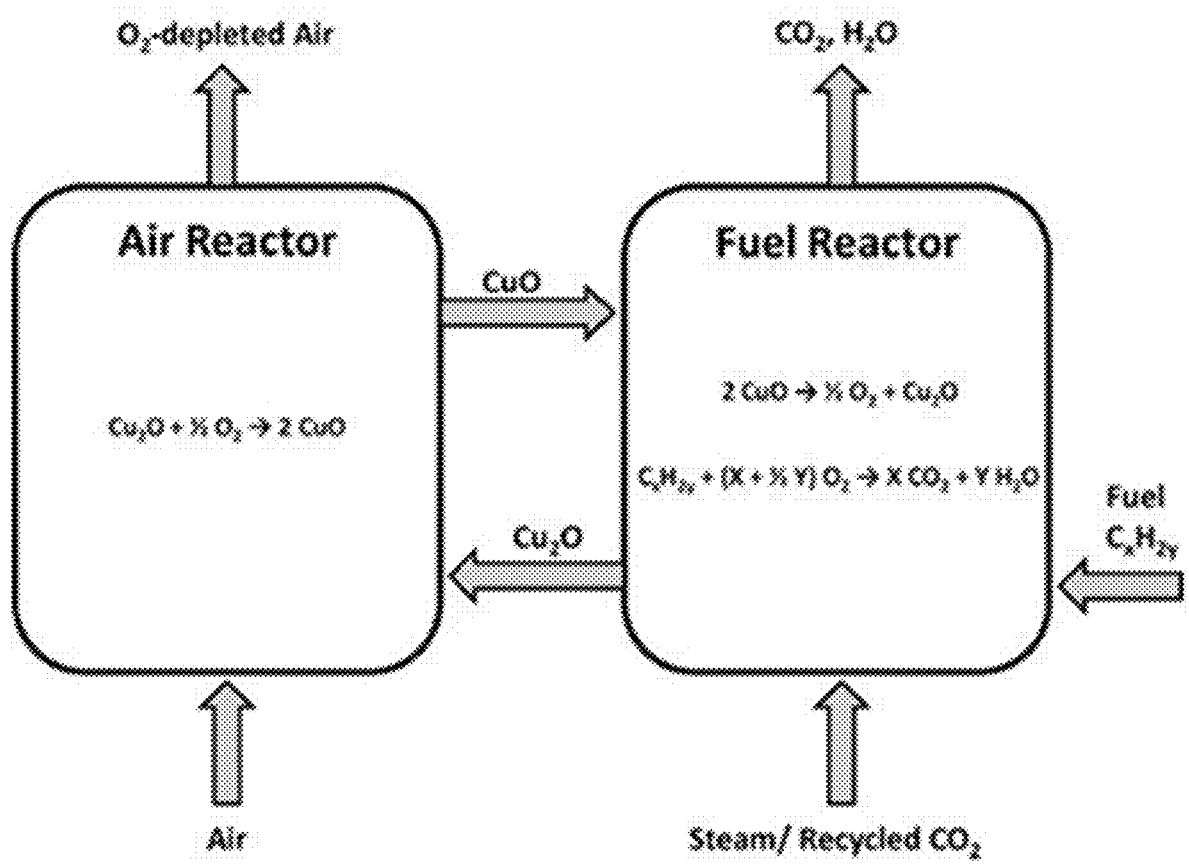
FIG. 1 is a schematic showing chemical looping combustion with CuO as the oxygen carrier.
Figure 2:
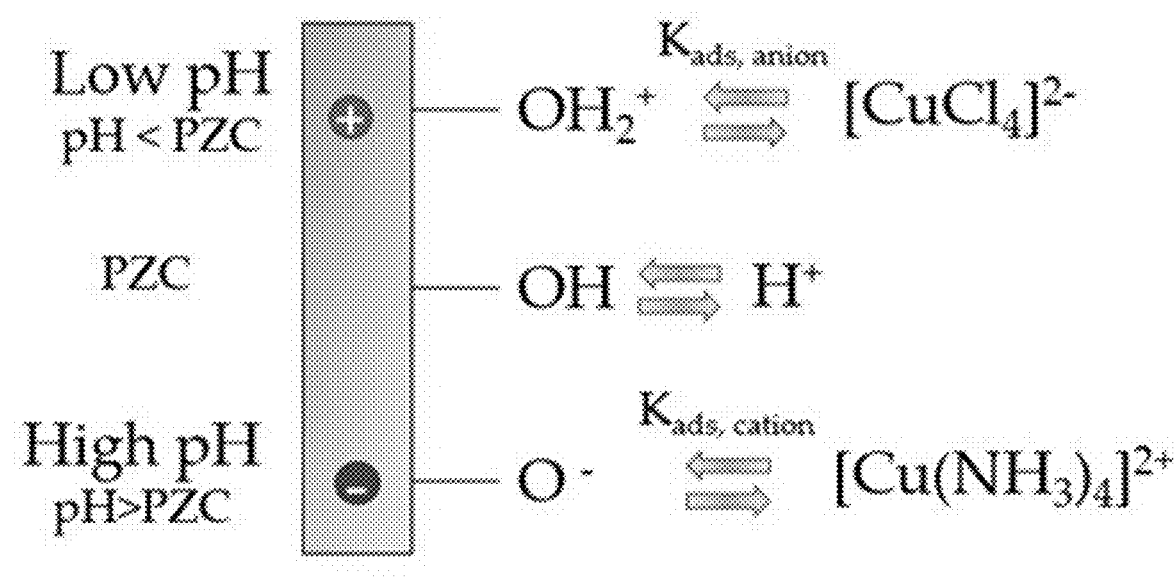
FIG. 2 is a schematic of molecular interactions for selective adsorption, showing regimes for anionic and cationic metallic species.

Embodiments of the present invention are novel selective adsorption wet co-impregnation methods for the manufacture of Cu-based OC on SiC and $SiO_2$ supports, enhancing the metal-support interaction to increase dispersion and reduce CuO sintering. In other embodiments one or more other transition metal oxides may be homogeneously bound on the surface and within the pores of a porous, for example microporous, mesoporous, or nanoporous, substrate using selective adsorption wet impregnation or co-impregnation. As used throughout the specification and claims, the term "selective adsorption" means any method by which a compound, for example as a metal coordination complex, is attracted to and bound to a substrate, including but not limited to selective adsorption, electrostatic adsorption, strong electrostatic adsorption, charge-enhanced impregnation, and the like, and the term "selectively adsorbed" correspondingly means any state in which a compound, for example a metal coordination complex, is attracted to and bound to a substrate, including but not limited to selectively adsorbed, electrostatically adsorbed, strongly electrostatically adsorbed, charge-enhanced impregnated, and the like.

Particles prepared using these methods can comprise relatively large oxide loadings, preferably over about 20 wt %, and exhibit agglomeration resistance and high reactivity over many regeneration cycles. In one example CuO/NiO@$SiO_2$ oxygen carrier (33 wt % CuO, 1 mol Ni/99 mol Cu) showed no signs of agglomeration up to 975° C. in fluidized bed testing, cycling between $CuO/Cu_2O$. Thermogravimetric analyzer (TGA) analysis showed no loss in oxygen transport capacity or decrease in kinetics over 100 cycles. SiC is a high-strength, relatively low-cost substrate, and $SiO_2$ achieves better CuO metal dispersion. Capillary migration during drying, metal-support interaction, and alloying with <1 wt % NiO were studied to meet the requirements of a high-quality oxygen carrier material. Particles were characterized using $N_2$ sorption tests and SEM, and they were screened based on TGA and fluidized bed performance. Samples that exhibited good reactivity and agglomeration resistance were examined with crush strength testing, x-ray diffraction (XRD), and multicycle TGA tests.

EXAMPLE

Raw Materials. Two support raw materials were investigated, nonporous, relatively inexpensive SiC, and porous $SiO_2$ (Cariact Q-10C from Fuji Silysia). The properties of these two materials are summarized in Table 2. The SiC support comprising up to 20 wt % CuO content was studied. The following two copper precursors were used in this study: (i) copper nitrate trihydrate (Sigma Aldrich, 99%) to prepare copper nitrate solution using deionized water; and (ii) tetraammine copper nitrate (TACN), prepared with the addition of excess ammonia (99%) until all copper hydroxide precipitate had dissolved, followed by dilution with deionized water. For co-impregnation of CuO and NiO, nickel nitrate hexahydrate (Sigma Aldrich, 99%) was dissolved into solution, then excess ammonia was added to produce hexaammine nickel nitrate (HANN), again followed by dilution. An aliquot of this solution was added to TACN to produce TACN/HANN for co-impregnation on SiO2.

TABLE 2

Measured characteristics of the support materials

| Support | SiC | SiO2 |
|---|---|---|
| Cost ($/kg, August 2018) | 3 | 95 |
| Size Range (μm) | 106–250 | 295–425 |
| Crush Strength (MPa) | 408 | 22.3 |
| BET Surface Area (m$^2$/g) | 0.1 | 330 |
| Bulk Density (g/mL) | 1.4 | 0.5 |

Oxygen Carrier on SiC. CuO supported on SiC OCs were prepared via wet impregnation (WI) or dry impregnation (DI). Lab scale WI was investigated in a rotary vaporizer (RV) and a rotary kiln (RK-1). Samples consisted of approximately 50 g of OC with 20 wt % CuO. All batches were prepared by wetting the support with excess Cu precursor solution, drying, and nitrate decomposition and oxidation to CuO at 350° C. Wetting was performed with copper nitrate and vigorous stirring. In both reactors, drying was performed at ambient pressure at 85° C. Drying and decomposition were carried out in a heating mantle without stirring. Four additions, which each included wetting, drying and nitrate decomposition steps, were performed to reach the desired value of 20 wt % CuO.

Oxygen Carrier on $SiO_2$. OC particles of 20 wt % CuO supported on $SiO_2$ were prepared by DI, following the same steps as those for the SiC support, except the volume of precursor used was the pore volume of the substrate as determined by Brunauer, Emmett and Teller (BET) analysis. A novel drying method was examined by preparing CuO on $SiO_2$ supports via wet impregnation with filtration and microwave drying (WIFM). The high pore volume of $SiO_2$ allowed high precursor retention after filtration, in contrast to SiC. Microwave drying was used to reduce copper precursor migration. Copper nitrate precursor was added slowly to the $SiO_2$ support in a Buchner funnel with stirring until excess volume was observed, to ensure homogeneous wetting. The funnel was then filtered of excess precursor, dried via microwave, followed by nitrate decomposition and oxidation at 350° C. in the heating mantle. A total of three additions of wetting, drying, and decomposition was required for the desired 20 wt % CuO material.

Novel selective adsorption methods with the copper precursor TACN were also explored for the $SiO_2$ support. Cu-based OCs with 25 wt % CuO were prepared via the selective adsorption wet impregnation (SAWI) method by wetting approximately 20 g of $SiO_2$ with 4.7 mL of 0.45 M TACN/g $SiO_2$, drying in the RV over several hours in a 120° C. oil bath, followed by washing with de-ionized water and nitrate decomposition at 350° C. OCs consisting of bimetallic CuO/NiO with 33.3 wt % CuO on $SiO_2$ were prepared via selective adsorption wet co-impregnation (SAWCI). The same procedure as SAWI was used, but the precursor solution contained a minor amount of nickel nitrate (NN) which complexes with excess ammonia in the TACN to form HANN, for a molar ratio of 1 mol Ni/99 mol Cu. For 33.3 wt % CuO, a precursor volume of 4.7 mL/g $SiO_2$ was used for three additions. SAWI and SAWCI preparation methods produced free-flowing particles after the drying stage, in contrast to impregnation with copper nitrate. A summary of the materials examined in this study is shown in Table 3, which includes the following codes: W=wet; D=dry; I=impregnation; F=filtration; M=microwave dry; SA=selective adsorption; CI=co-impregnation; NN=nickel nitrate; TACN=tetraammine copper nitrate.

TABLE 3

Summary of prepared oxygen carriers.

| Code | Desired CuO Loading (wt %) | Precursor | Phase separation | Additions |
|---|---|---|---|---|
| WI-20-SiC | 20 | Copper nitrate | No | 4 |
| DI-20-SiC | 20 | Copper nitrate | No | 4 |
| DI-20-SiO$_2$ | 20 | Copper nitrate | No | 2 |
| WIFM-20-SiO$_2$ | 20 | Copper nitrate | Filtration | 3 |
| SAWI-25-SiO$_2$ | 25 | TACN | No | 2 |
| SAWI-40-SiO$_2$ | 40 | TACN | No | 4 |
| SAWCI-12-SiO$_2$ | 12 | TACN/NN | No | 1 |
| SAWCI-25-SiO$_2$ | 25 | TACN/NN | No | 2 |
| SAWCI-33-SiO$_2$ | 33 | TACN/NN | No | 3 |
| SAWCI-40-SiO$_2$ | 40 | TACN/NN | No | 4 |

One pilot-scale batch (3 kg) was produced using the SAWCI technique using a rotary kiln (40 cm diameter, 1.8 m long). The surface of the kiln was externally heated with natural gas burners, and $NO_2$ was captured in a NaOH absorbing column. Bimetallic OC with 12 wt % CuO and 1 mol Ni/99 mo Cu was produced over one addition. Drying was performed at 120° C. at 3 rpm over 2 h. Free-flowing particles were then retrieved, washed with tap water, and loaded into the kiln for nitrate decomposition and oxidation at 350° C.

Particle Characterization. To measure the quality of produced materials and screen for impregnation methods with potential for scale-up, particle size distribution (wt %) was analyzed by sieving. CuO loading was determined by TGA cycling (see below), and in some cases confirmed by inductively coupled plasma mass spectroscopy (ICP-MS) elemental analysis. The crush strength of individual particles was analyzed with a Shimpo FGE-5X with 25 replicates. The crush force was normalized to crush pressure by dividing by the average cross-sectional area of the particles, resulting in units of MPa. Bulk density was determined by performing the tapped bulk density test for powders. Surface area and pore volume was examined with a Micromeritics Tristar II surface area and porosity analyzer using $N_2$ physisorption at 77 K. Surface morphology, in particular CuO crystallite size and dispersion, was analyzed with a FEI Quanta 600 scanning electron microscope (SEM) with elemental composition analysis by energy dispersive X-ray spectroscopy (EDS or EDX). To examine penetration to the interior of the pore structure of the support, particles were set in epoxy, polished, and examined with SEM-EDX map scans. X-ray powder diffraction (XRD) was used to determine the crystalline phases, using a DT Bruker instrument.

Figure 3A:
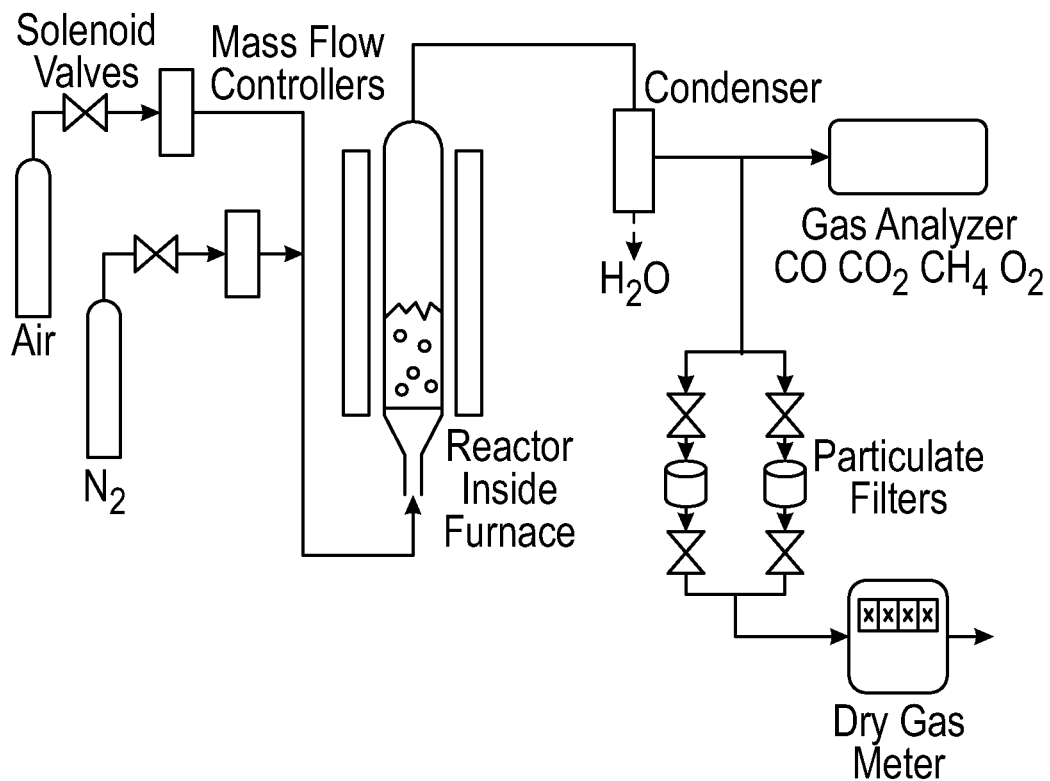
FIG. 3A is a schematic for quartz fluidized bed setup.
Figure 3B:
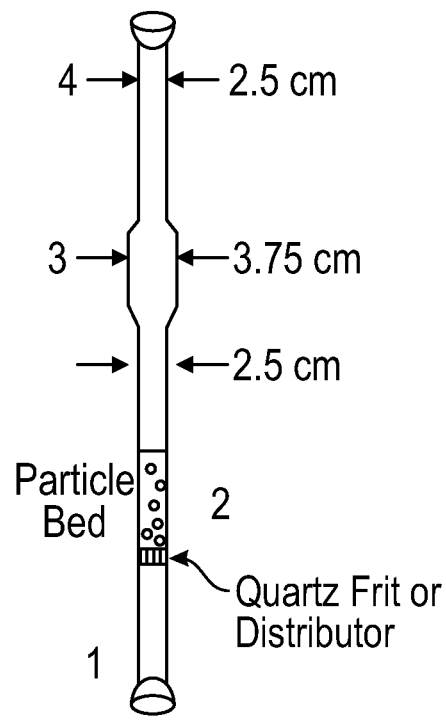
FIG. 3B is a detail of the reactor in the fluidized bed setup of FIG. 3A.

Fluidized Bed Testing. A screening test was performed to identify OCs with good resistance to sintering using a quartz fluidized bed, a schematic of which is shown in FIG. 3A. As shown in FIG. 3B, the reactor consisted of the following zones: (1) inlet, (2) bed, supported by a sintered quartz frit, (3) freeboard expansion zone, and (4) outlet. The bed inner diameter (ID) was 2.54 cm and the superficial gas velocity was 0.15 m/s, approximately three times the minimum fluidization velocity. The OC bed volume was 20 cm$^3$ for each test and the bed was heated by a Carbolite VST 12/600 clamshell furnace. Agglomeration temperature was measured for each prepared sample. The onset of defluidization was detected by a sharp decrease in the pressure drop variation, and agglomeration was confirmed by visual observation. Particles were heated to 850° C. in air at 30° C./min, then CLOU cycling was initiated. One cycle was five-minute decomposition in $N_2$ followed by five-minute oxidation in air (21 vol % $O_2$). If no de-fluidization was detected after five cycles, the temperature was ramped up 25° C. in air to 875° C., and the five-cycle test was repeated. The maximum temperature tested, due to quartz reactor suitability, was 975° C. If agglomeration was detected below 950° C., the impregnation method for that sample was not examined further. Attrition was analyzed with downstream filters, but the amount collected was too small to be accurately studied.

Thermogravimetric Analysis. The ability to maintain high reaction rate over many regeneration cycles, or cyclability, was assessed by operation in TA Instruments Q-500 TGA at CLOU reactor temperatures (900-950° C.). Multicycle tests analyzed the OTC for up to 100 cycles by switching between oxidizing and inert environments. The atmospheres were air and nitrogen for the oxidation and decomposition reactions, respectively. Cycles ranged from 5 to 15 min to allow full conversion, as the rate was highly dependent on the CuO loading and impregnation method. OC samples of 8-15 mg were placed as monolayers on platinum pans and ramped at 30° C./min to the desired temperature. Preliminary tests were performed to control for external mass transfer effects, which were deemed negligible at 120 mL/min gas flow rate.

$$OTC = \frac{m_{ox} - m_{red}}{m_{ox}} \quad (2)$$

$$CuO \text{ loading} = 9.94 \frac{g\ CuO}{g\ O_2} \times OTC \quad (3)$$

$$x_{ox}(t) = \frac{m(t) - m_{red}}{m_{ox} - m_{red}} \quad (4)$$

$$x_{dec}(t) = \frac{m_{ox} - m(t)}{m_{ox} - m_{red}} \quad (5)$$

OTC was estimated by examining the fully oxidized ($m_{ox}$) and reduced ($m_{red}$) masses for an individual cycle, shown by Equation (2). The fifth cycle was selected for analysis. Equation (3) shows the experimental CuO loading, which was estimated from the OTC and the theoretical oxygen capacity for pure CuO from Equation (1). This measured value was compared with the desired CuO loading to assess the quality of impregnation batches. For clarity, the normalized wt % change is reported, defined as the instantaneous mass divided by the mass at the start of the first cycle prior to decomposition. For a 20 wt % CuO content OC, decomposition would proceed from 100% to 98% over the first cycle, corresponding to an OTC of 2%. FIG. 6 shows that occasionally oxidation never reached full conversion. Since tests indicated that complete conversion in such cases was not reached even after an hour, 15 min was selected as the cycle time to estimate a reasonable OTC in a real chemical looping reactor. Conversion over was examined for both oxidation and decomposition reactions using Equations 4 and 5, respectively. $X_{ox}$ defines the percentage of $Cu_2O$ converted to CuO, while $X_{dec}$ defines the opposite reaction.

Figure 4A:
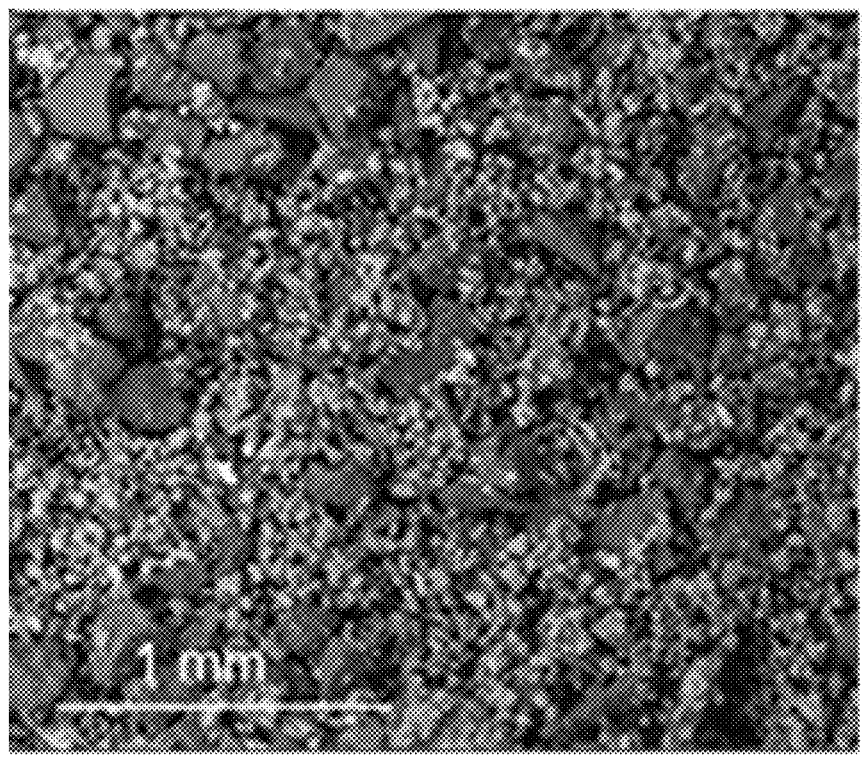
FIG. 4A is a scanning electron microscope (SEM) micrograph of the WI-20-SiC sample.

WI vs. DI. Two wet impregnation reactor types were tested for 20 wt % CuO on SiC supports. Regardless of the reactor, rotary kiln or rotary vaporizer, the desired CuO content was not reached due to uneven deposition. The measured CuO loading was approximately 50% of the expected value within the range of 106-250. This indicates that a significant fraction of CuO did not bind to the support surface. A sizable portion of fines was observed below the initial size range (106 m) of the support material SiC. TGA analysis indicated that the fines were composed of nearly 100% CuO, and this was confirmed visually by SEM micrographs as shown in FIG. 4A. On the other hand, DI samples were identified to deposit over 90% of the desired CuO onto SiC, and thus DI was explored further.

Figure 4B:
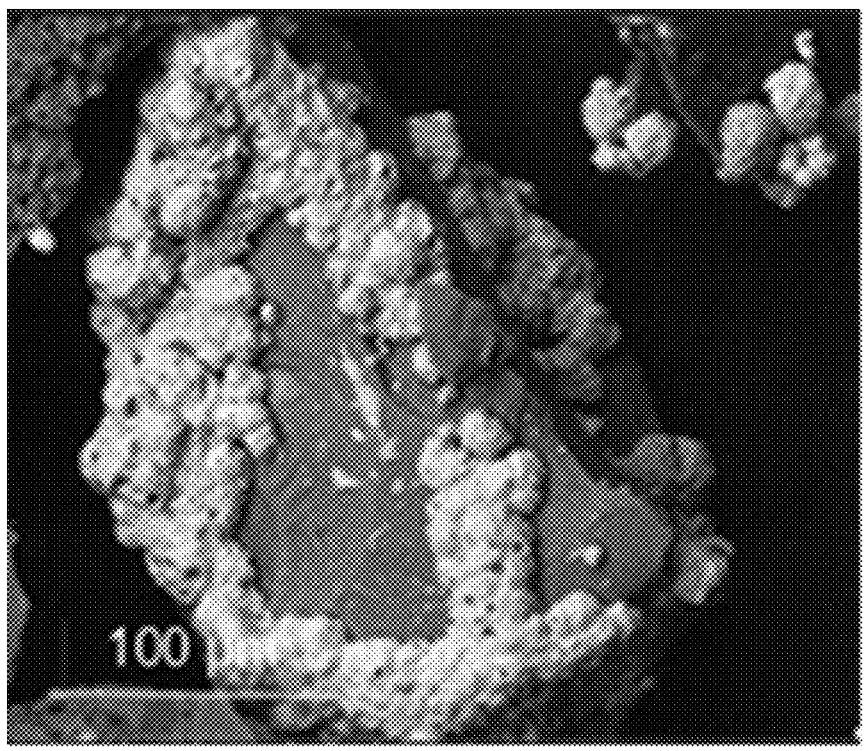
FIG. 4B is an SEM micrograph of the DI-20-SiC sample.
Figure 4C:
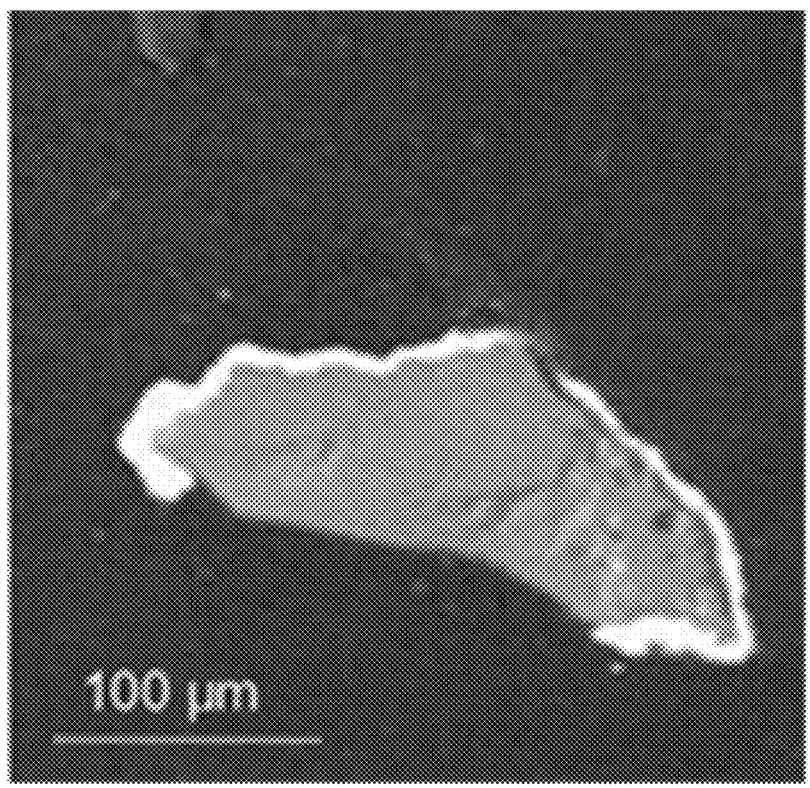
FIG. 4C is an SEM micrograph of the DI-20-SiC sample of FIG. 4B set in epoxy and polished, showing the internal matrix.

For DI samples, CuO was almost entirely located on the external surface, due to the low surface area of the SiC support. FIGS. 4B and 4C show a thick, uneven shell of CuO attached to SiC. The poorly stabilized CuO is undesirable due to the high risk of sintering and associated problems. Fluidization tests indicated a high agglomeration risk for DI particles and regardless of the method of preparation (number of additions, copper nitrate concentration), since particles always agglomerated below 900° C. Agglomeration was detected soon after the first gas switch to air, indicating that the temperature rise associated with the exothermic oxidation led to particle sintering. SiC supported OC material was very difficult to retrieve from the reactor due to the severity of agglomeration. Table 4 summarizes the measured BET surface area and agglomeration temperatures of the OC materials investigated in this work.

TABLE 4

BET surface area of fresh samples, agglomeration temperatures determined in fluidized bed testing, and OTC estimated with TGA cycling.

| Code | BET SA (m²/g) | $T_{agglomeration}$ (C.) | OTC (g $O_2$/g OC) |
| --- | --- | --- | --- |
| WI-20-SiC | 0.1 | 900 | 0.009 |
| DI-20-SiC | 0.1 | 900 | 0.019 |
| DI-20-SiO$_2$ | 200 | 925 | 0.020 |
| WIFM-20-SiO$_2$ | 276 | 950 | 0.018 |
| SAWI-25-SiO$_2$ | 300 | >975 | 0.001 |
| SAWCI-33-SiO$_2$ | 320 | >975 | 0.033 |

Figure 5A:
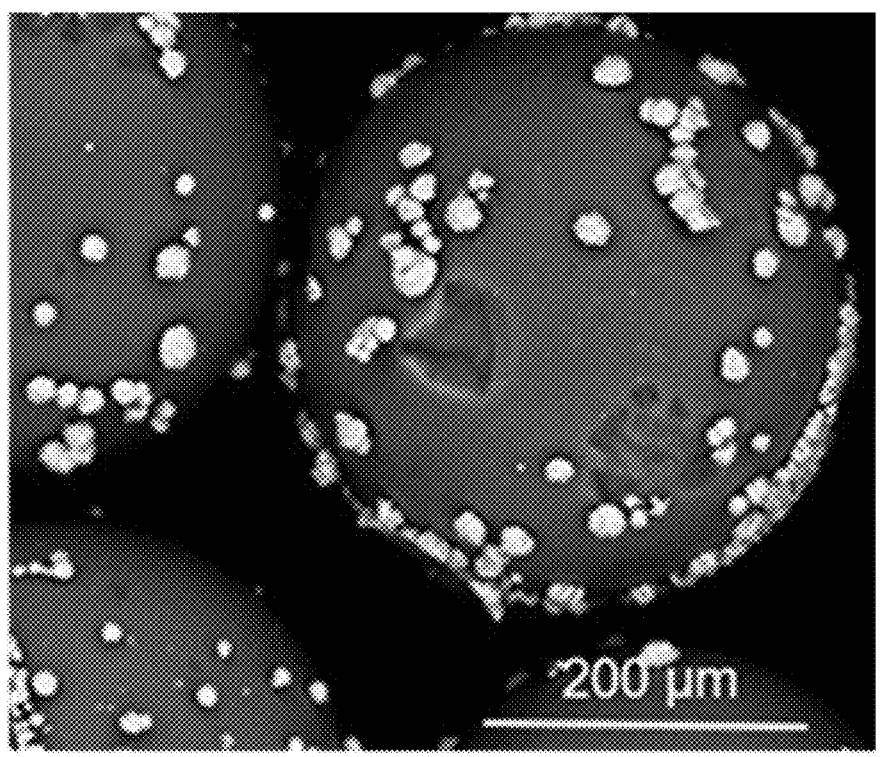
FIG. 5A is an SEM micrograph of the DI-20-$SiO_2$ sample.
Figure 6A:
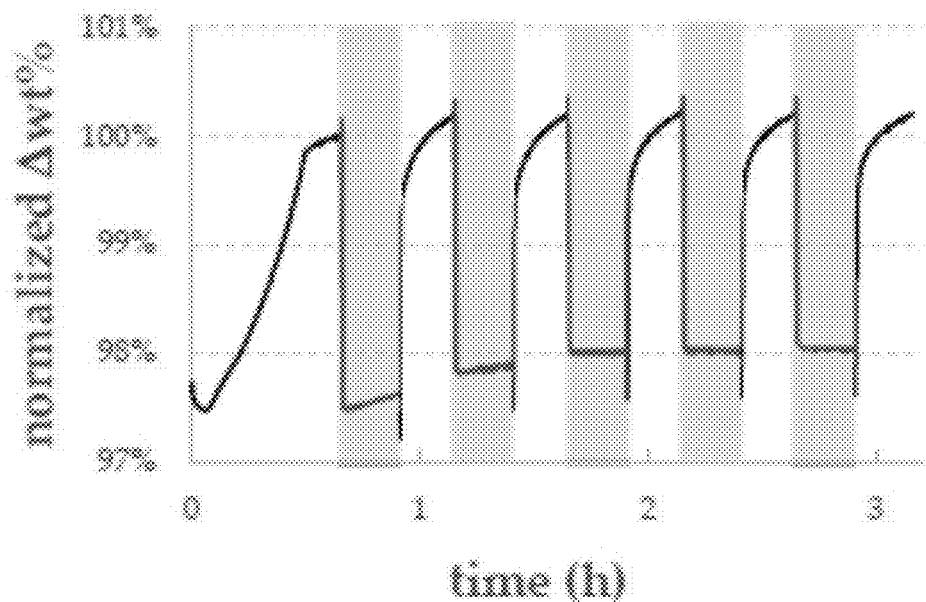
FIG. 6A shows a thermogravimetric analyzer (TGA) profile for CuO loading estimates for DI-20-SiC, 15-minute cycles at 900° C., $CuO/Cu_2O$ cycling. Shaded regions are $N_2$ atmosphere. The Y-axis is the wt % change from the oxidized mass at the start of the first cycle.
Figure 6B:
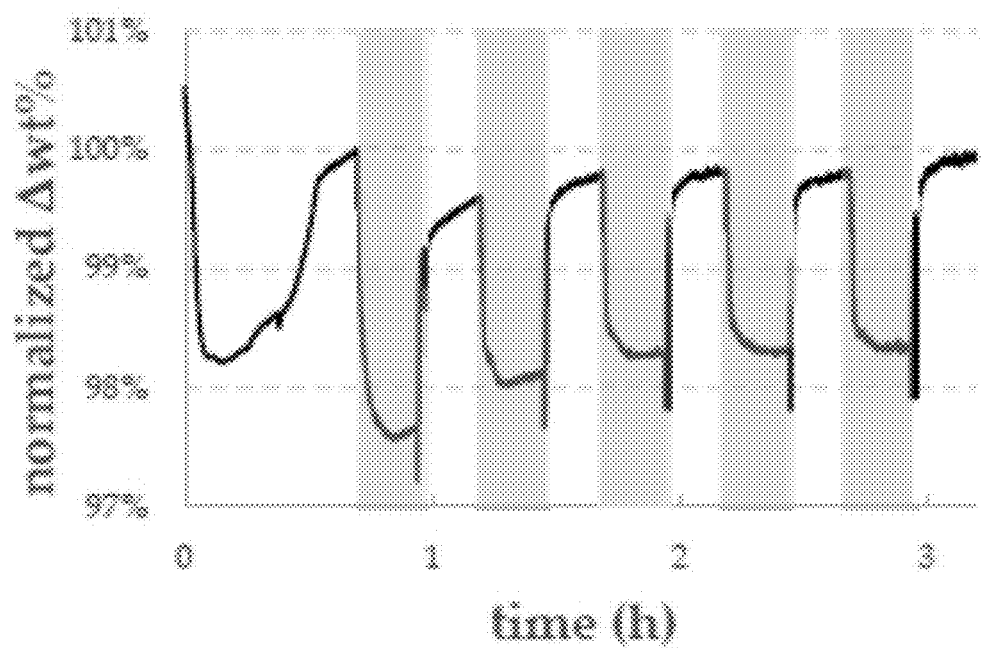
FIG. 6B shows a TGA profile for CuO loading estimates for DI-20-$SiO_2$, 15-minute cycles at 900° C., $CuO/Cu_2O$ cycling. Shaded regions are $N_2$ atmosphere. The Y-axis is the wt % change from the oxidized mass at the start of the first cycle.

SiC vs. SiO$_2$. The results of DI with SiO$_2$ supports were compared with those with SiC supports. The greater voidage of SiO$_2$ supports allowed for higher precursor volume, so fewer additions were required to reach 20 wt % CuO content. Surface area after deposition and calcination at 350° C. of CuO typically dropped from roughly 300 to 200 m²/g for SiO$_2$. A typical SEM image of CuO on SiO$_2$ supports is shown in FIG. 5A. The brightly shaded CuO crystallites were relatively large (about 10-20 μm) and unevenly dispersed on the SiO$_2$ surface. TGA cycling tests for SiC and SiO$_2$ are shown in FIGS. 6A and 6B, respectively. SiC-supported OC exhibited fast and complete reactions (the curves for each cycle reached 100% or greater); however the aforementioned agglomeration problems preclude using SiC as practical substrate material. In contrast, SiO$_2$-supported OC showed only partial re-oxidation. Fluidization testing indicated slight improvement over the SiC supported material. The particles could be fluidized at a higher temperature and the agglomerated material could easily be broken apart, signaling less severe agglomeration. Agglomeration was still detected at 925° C. (see Table 4), again during the oxidation stage.

Figure 5B:
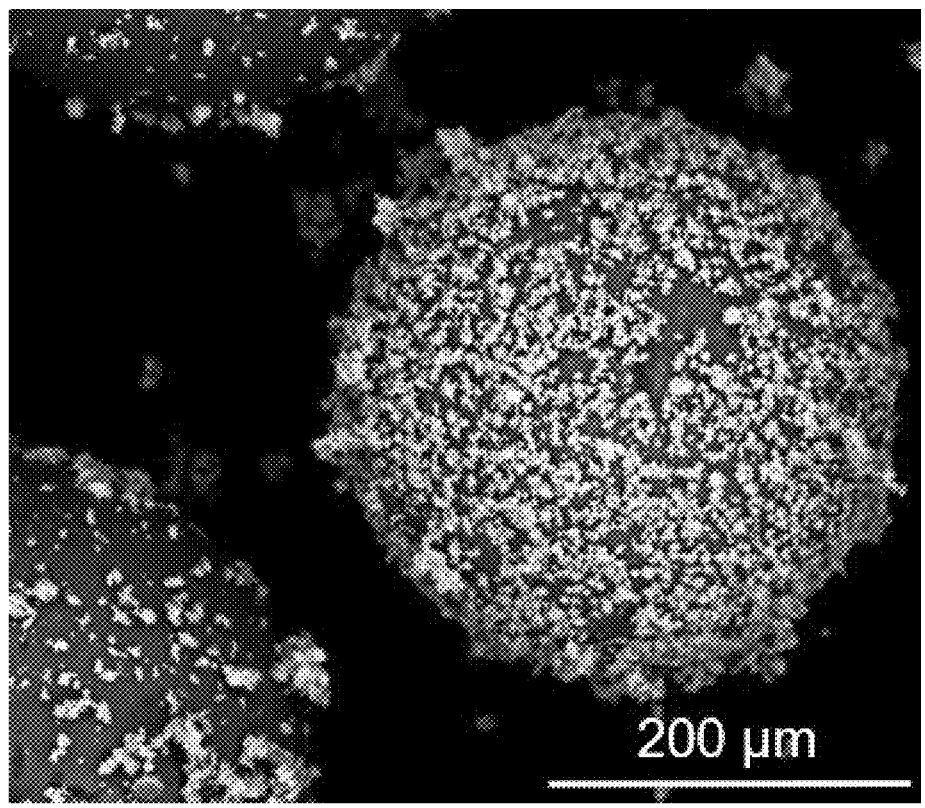
FIGS. 5B and 5C are SEM micrographs of the WIFM-20-$SiO_2$ sample at higher and lower magnifications, respectively.
Figure 5C:
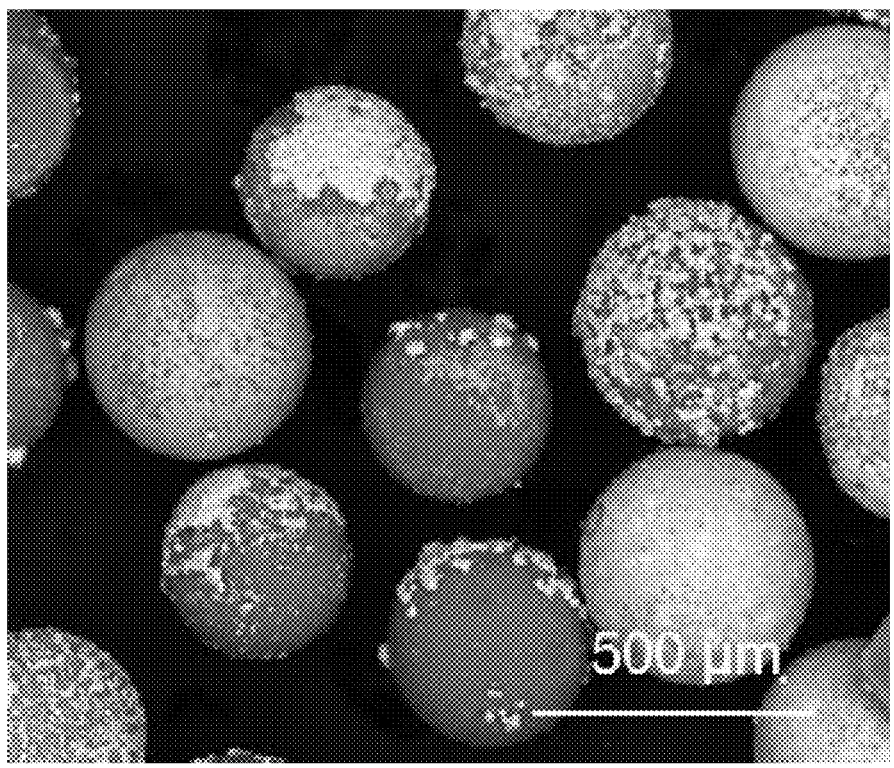

Novel impregnation methods on SiO$_2$. SEM images of the WIFM-20-SiO$_2$ in FIGS. 5B-5C indicate that microwave drying improved CuO dispersion. The CuO crystallite size on the external surface was also notably smaller. Agglomeration testing showed good fluidization up to 950° C., at which point agglomeration occurred. The aggregates were easily fragmented, indicating less severe agglomeration than what occurred with the SiC supported material. The images and agglomeration temperature can be contrasted with the dry impregnation samples, DI-20-SiC and DI-20-SiO$_2$ (shown in FIGS. 4B and 5A, respectively), which were dried in the heating mantle.

Figure 5D:
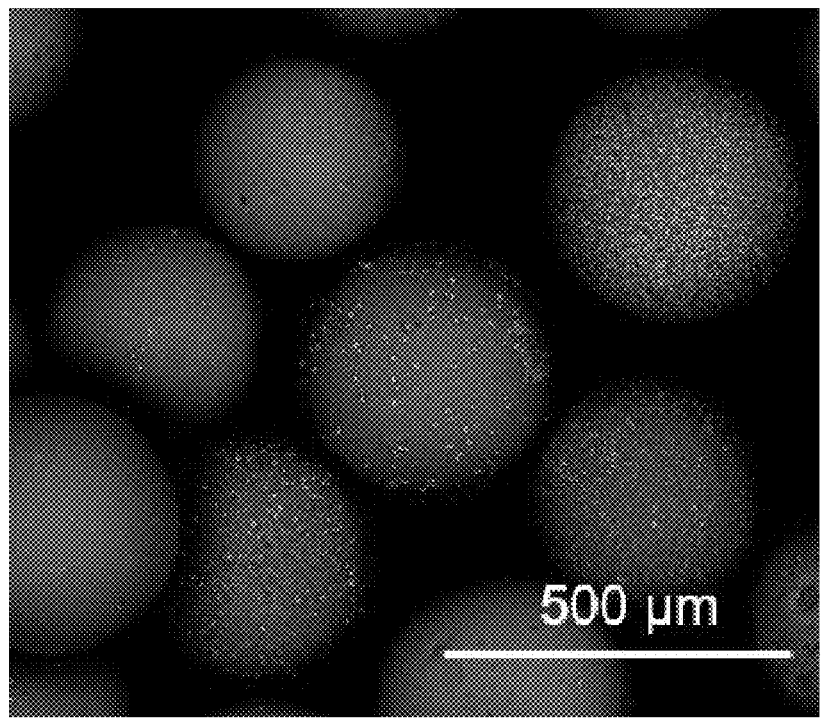
FIG. 5D is an SEM micrograph of an SAWI-25-$SiO_2$ sample produced without a wash step.
Figure 5E:
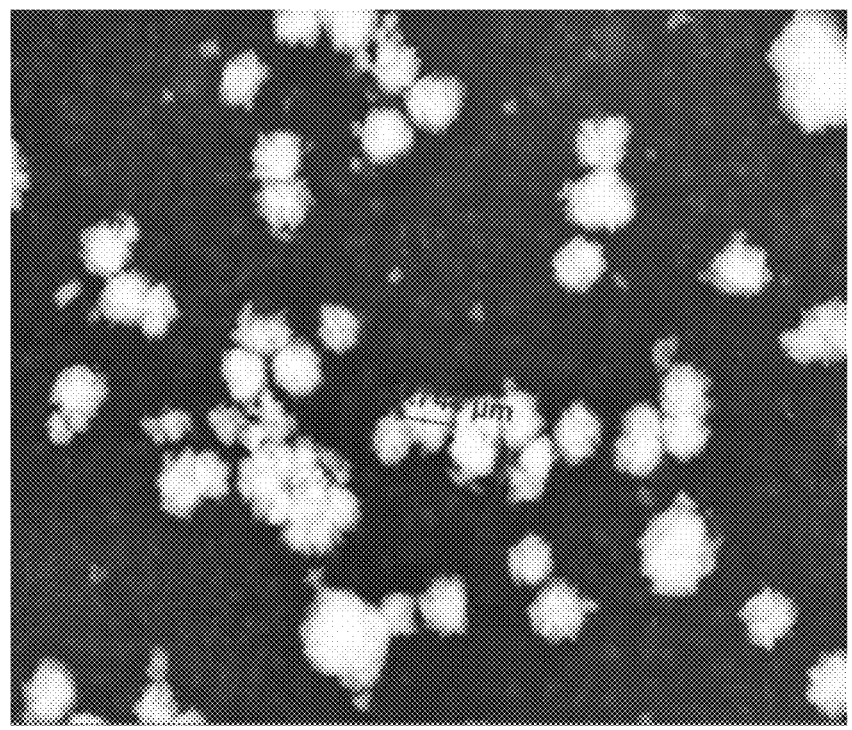
FIG. 5E is an SEM micrograph of the sample of FIG. 5D at higher magnification showing CuO sub-particles.
Figure 5F:
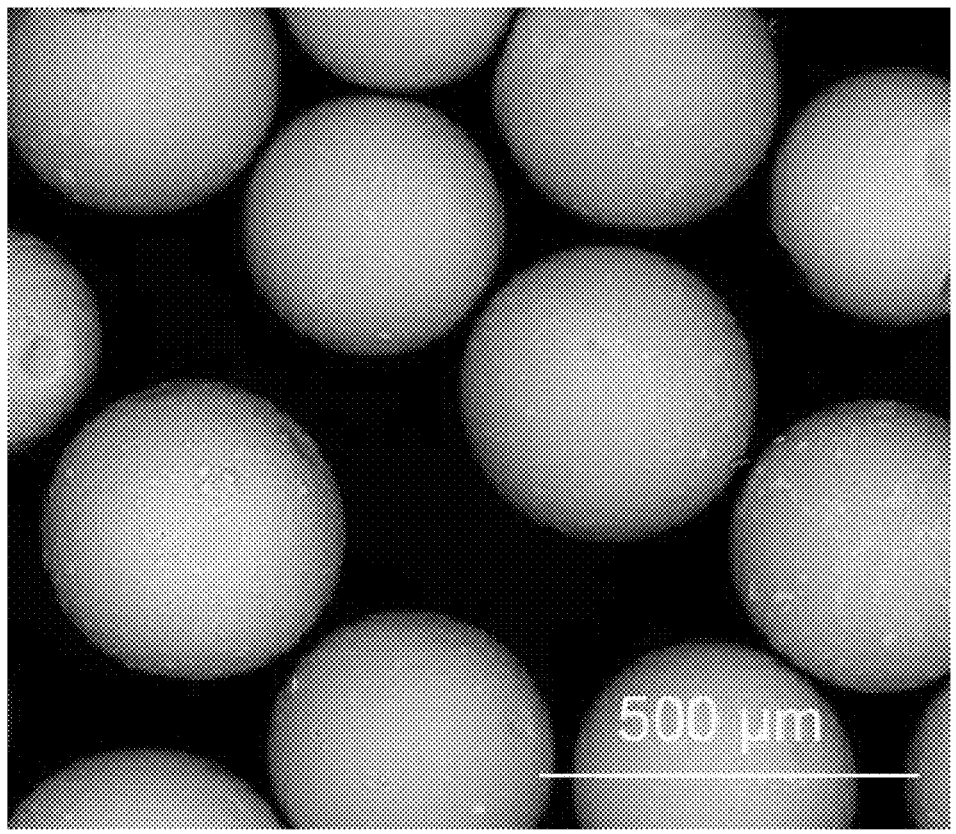
FIG. 5F is an SEM micrograph of an SAWI-25-$SiO_2$ sample produced using a wash step, showing fewer visible CuO subparticles.

An alternate copper precursor, TACN, was investigated to improve CuO dispersion via improved metal-support interaction for the batch SAWI-25-SiO$_2$. Improved affinity of Cu to the SiO$_2$ surface was qualitatively observed during preparation, as the support material turned dark blue. After decomposition at 350° C., the BET surface area was still very high, 300 m²/g. As the SEM micrographs in FIGS. 5D and 5E show, the CuO crystallites were very small when the wash step was not incorporated. The maximum observed crystallite size was 1-2 μm. With the wash step, external CuO crystallites could not be identified on the particle surface, as shown in FIG. 5F.

Figure 7A:
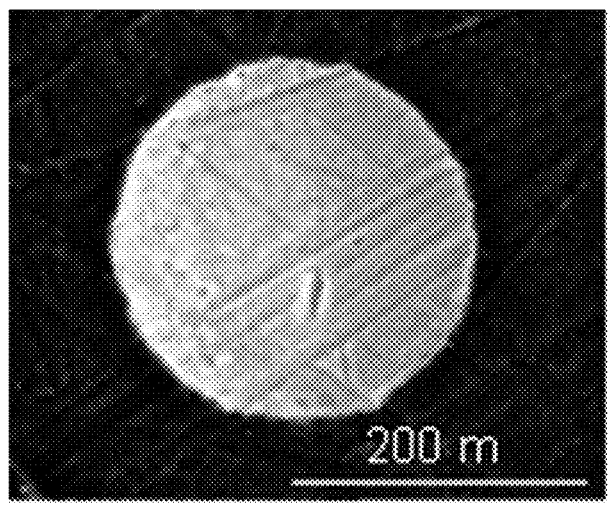
FIG. 7A is an SEM/EDS image of an SAWI-25-$SiO_2$ particle.
Figure 7B:
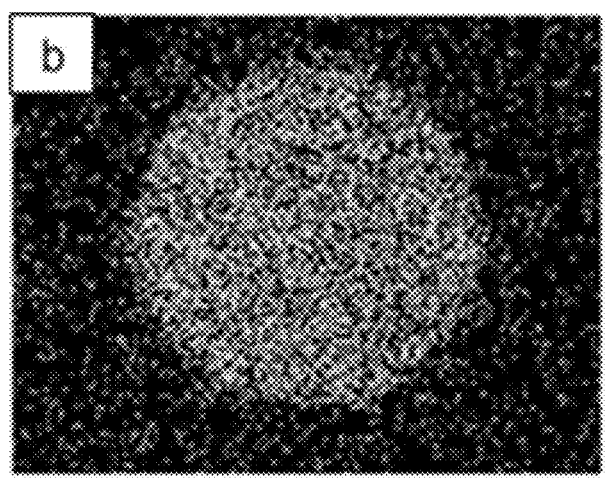
FIGS. 7B and 7C are Cu and Si elemental analysis maps, respectively, for the particle of FIG. 7A.
Figure 7C:
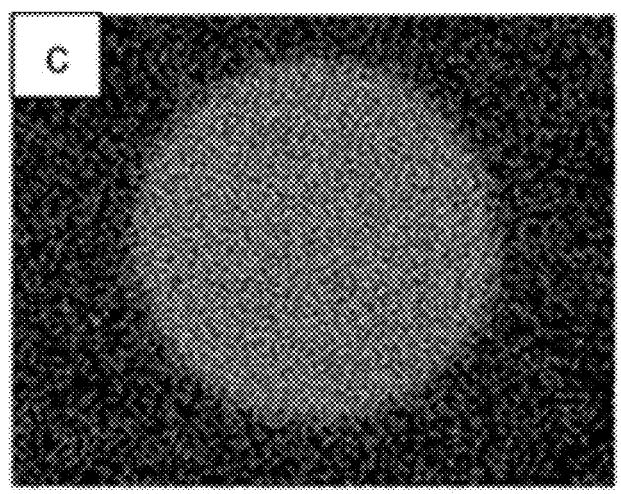

The dispersion across the internal matrix of an SAWI-25-SiO$_2$ particle was analyzed using SEM/EDS of particles set in epoxy and polished, as shown in FIG. 7A-FIG. 7C. An even, uniform distribution of Cu and Si throughout the particle can be seen, indicating full penetration into the center of the particle at the scale, such as nanoscale, mesoscale, microscale, etc., of the pores in the particle. These results demonstrate that homogeneous dispersion of CuO in the substrate is feasible with this technique. The fluidization tests showed no signs of agglomeration for all temperatures tested, up to 975° C.

Figure 6C:
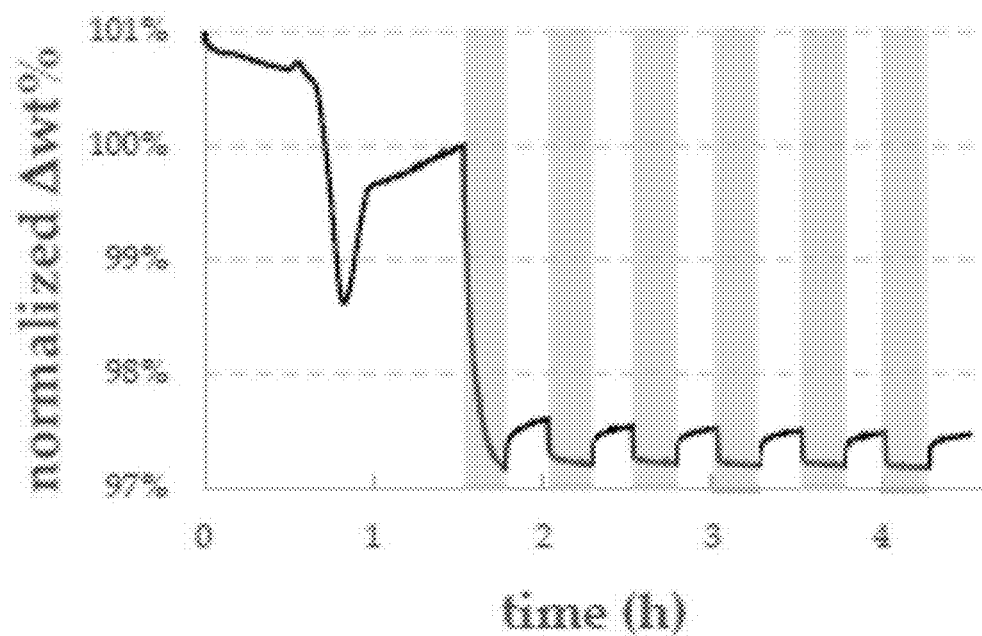
FIG. 6C shows a TGA profile for CuO loading estimates for SAWI-25, 15-minute cycles at 900° C., $CuO/Cu_2O$ cycling. Shaded regions are $N_2$ atmosphere. The Y-axis is the wt % change from the oxidized mass at the start of the first cycle.
Figure 6D:
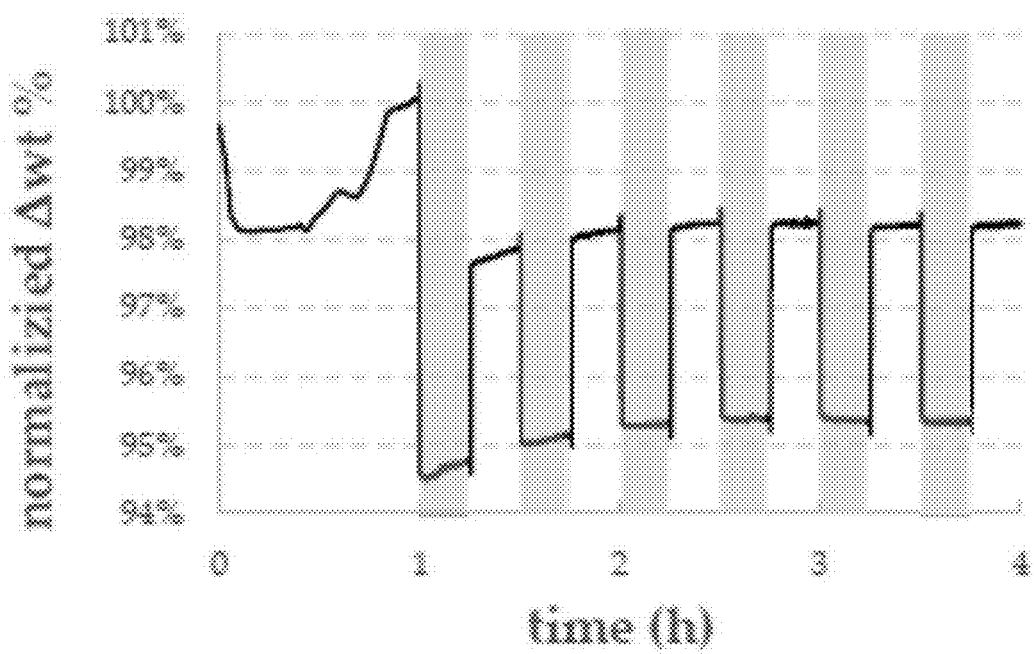
FIG. 6D shows a TGA profile for CuO loading estimates for SAWI-25, 15-minute cycles at 900° C., Cu/CuO cycling. Shaded regions are 4 vol % $H_2/N_2$ reducing atmosphere. The Y-axis is the wt % change from the oxidized mass at the start of the first cycle.

However, TGA reactivity was poor at 900° C. for the SAWI-25-SiO$_2$ OC sample. CuO/Cu$_2$O cycling with air and nitrogen environments resulted in large initial decomposition but incomplete re-oxidation, as shown in FIG. 6C. This was observed for many samples, regardless of calcination, particle size, and oxidation time. In order to clarify the reactions taking place, kinetic analysis was performed with a reducing gas. FIG. 6D shows Cu/CuO cycling in air and in a 4% H$_2$/N$_2$ environment, which resulted in a large weight loss, signaling the reduction reaction. After the gas switch to air, the weight gained about 50% of the original mass, indicating the sample was partially oxidized to Cu$_2$O. The stable weight after partial re-oxidation indicated no diffusion or kinetic limitations for the oxidation reaction to CuO. ICP-MS was used to confirm the presence of elemental Cu. The measured Cu content corresponded to the initial TGA weight drop from decomposition. Poor re-oxidation was observed over the relevant temperature range of 900-950° C. The likely cause for this is inhibited diffusion through the product layer and pore blockage, as is discussed in greater detail below. Incomplete oxidation of Cu$_2$O to CuO is unacceptable for CLOU processes, and thus the SAWI method was not examined further.

Figure 8:
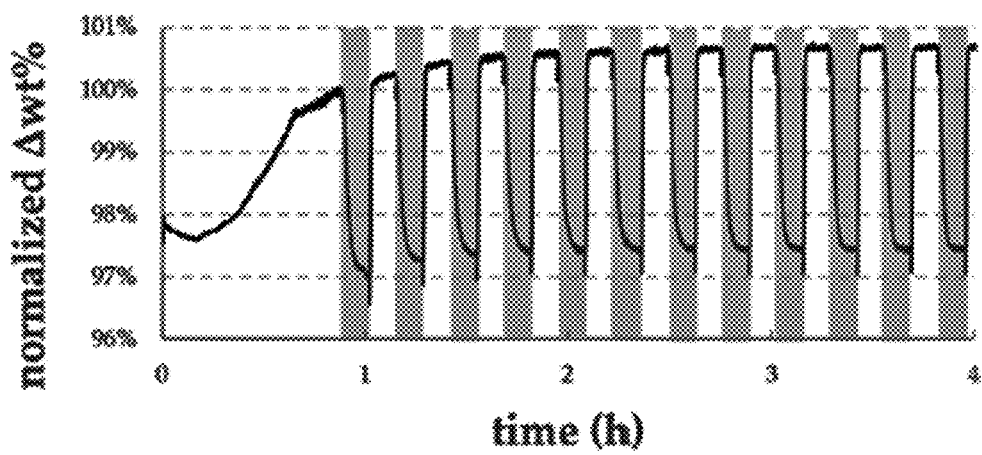
FIG. 8 shows a TGA profile of SAWCI-33, $CuO/Cu_2O$ cycling, 8-minute cycles for both decomposition in inert $N_2$ atmosphere and oxidation in air at 950° C.

Selective adsorption wet co-impregnation (SAWCI) on SiO$_2$. A bimetallic Cu/Ni OC, SAWCI-33-SiO$_2$, was prepared using a mixed TACN/HANN precursor with 1 mol % Ni content. This batch demonstrated excellent reactivity, as shown by the TGA curve at 950° C. in FIG. 8. The instrument-induced drift above 100% normalized weight was observed frequently over the first few cycles and showed no dependence on oxygen carrier sample and preparation method. The oxidation and decomposition reactions were fast and complete. Fluidization tests confirmed excellent agglomeration resistance. No particle aggregation or sintering effects were observed at 975° C., the maximum temperature tested. One batch of the same composition was manufactured in a pilot scale rotary kiln to test the feasibility of scaling this method. Approximately 3 kg of 12 wt % CuO/NiO@SiO$_2$ was successfully prepared over one addition in a large rotary kiln for pilot scale demonstration. No unattached CuO fines or particle aggregates were identified after the 350° C. calcination step, indicating similar quality material to the lab scale synthesis.

The internal surface area of SAWCI-33-SiO$_2$ was high prior to high temperature fluidization or calcination. Material calcined below 350° C. had a surface area of 480 m²/g, about 50% greater than the uncoated SiO$_2$ support material. This increase could stem from the roughness added by small CuO islands within the porous structure of the SiO$_2$. Crush strength increased with CuO content, to 40 MPa (+/−11) for SAWCI-12-SiO$_2$ and up to 62 MPa (+/−20) for SAWCI-33-

Figure 9:
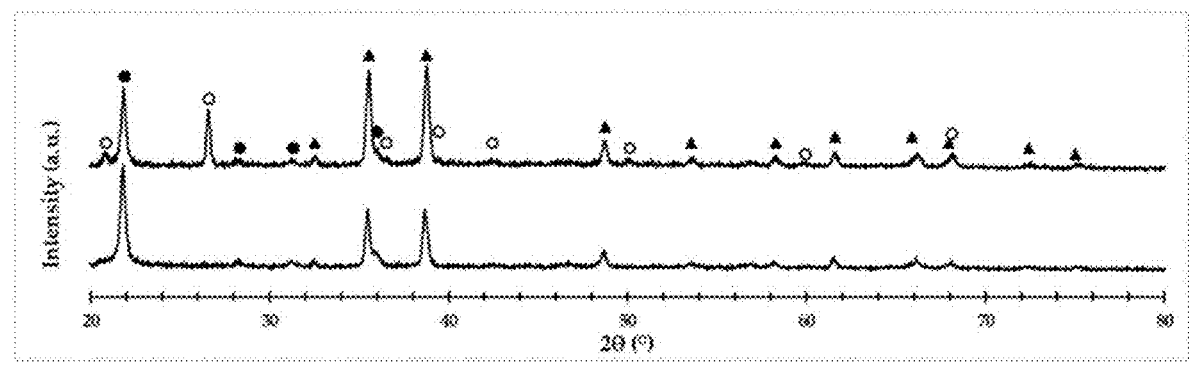
FIG. 9 shows x-ray diffraction (XRD) patterns of the oxygen carrier after impregnation and calcination at 1000° C. The top curve is for bimetallic SAWI-25-$SiO_2$. The bottom curve is for monometallic SAWI-25-$SiO_2$. CuO peaks are denoted with (▲), α-quartz ($SiO_2$) peaks are denoted with (o), and α-cristobalite ($SiO_2$) peaks are denoted with (●).

$SiO_2$. For the 12 wt % CuO sample, this value dropped after fluidized bed testing with CO reducing gas to 24.5 MPa (+/−6.4). XRD analysis was performed on SAWI-25-$SiO_2$ and SAWCI-25-$SiO_2$ samples, and the results are shown in FIG. 9. CuO phases were identified in both samples, whereas crystalline $SiO_2$ was only seen for the SAWCI samples with NiO present. It was not observed for the monometallic samples. This indicates that the presence of NiO affected the crystallization of the initially amorphous $SiO_2$, which occurred at lower temperature for the SAWCI samples than for the SAWI samples.

The effect of doping with NiO was examined using $N_2$ sorption measurements. For the samples with 40 wt % CuO, the monometallic sample SAWI-40-$SiO_2$ demonstrated a much higher surface area compared to the bimetallic sample SAWCI-40-$SiO_2$ (Table 5). The average pore diameter was slightly greater for the bimetallic sample. Heat treatment was demonstrated to have a far greater influence on the porous structure, with a decrease in surface area from 300 to 10.7 $m^2/g$ after 1000° C. calcination in air environment. Fluidized bed operation in a fluidized bed reactor (FBR) at 950° C., cycling between air and hydrogen reducing atmosphere, further reduced the surface area, but made no change in the average pore diameter.

TABLE 5

Measured BET surface area and Barrett, Joyner, and Halenda (BJH) pore diameter of 12 and 40 wt% CuO samples prepared by the SAWI and SAWCI methods

| Sample | BET SA ($m^2/g$) | Average Pore Diameter (nm) |
| --- | --- | --- |
| SAWCI-40-$SiO_2$ | 321 | 3.9 |
| SAWI-40-$SiO_2$ (monometallic) | 482 | 3.1 |
| SAWCI-12-$SiO_2$ | 307 | 4.1 |
| SAWCI-12-$SiO_2$ 1000 °C. Calcine | 10.7 | 0.5 |
| SAWCI-12-$SiO_2$ after 950 °C. FBR | 5.3 | 0.5 |

Figure 10A:
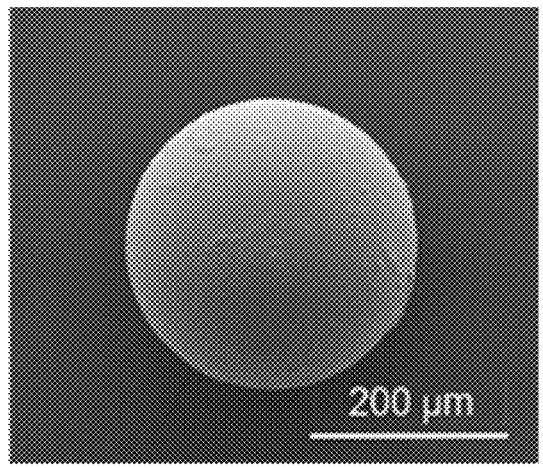
FIG. 10A is an SEM micrograph SAWCI-33-$SiO_2$ after impregnation and $NO_2$ decomposition at 350° C.
Figure 10B:
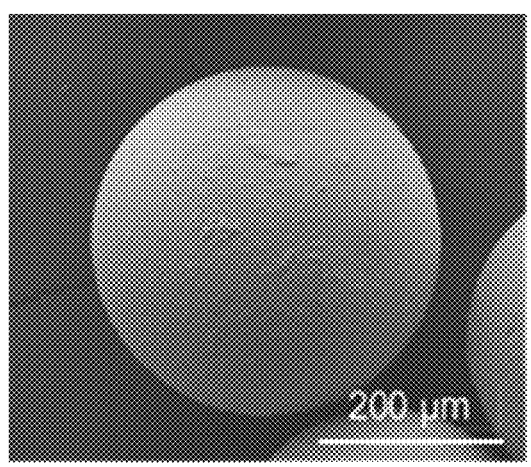
FIG. 10B is an SEM micrograph of SAWCI-12-$SiO_2$ after calcination at 1000° C.
Figure 10C:
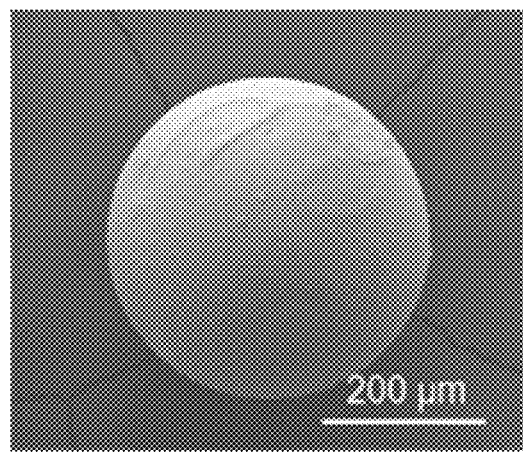
FIG. 10O is an SEM micrograph of SAWCI-12-$SiO_2$ after fluidized bed testing at 975° C. with CO reducing gas.

The poor oxidation of $Cu_2O$ to CuO, as shown in FIGS. 6A-6D, has several possible explanations, but no definitive conclusions are available at this point. Literature suggests oxidation can be inhibited by slow diffusion caused by large CuO grain size. However, FIG. 5F shows no visible CuO crystallites for the washed SAWI sample, which demonstrated the most inferior oxidation to CuO. If no CuO crystallites are visible with the SEM, then large grain size is most likely not the issue, since solid state diffusion effects are negligible at small scale. SEM micrographs did not show a significant difference between SAWI (FIG. 5F) and SAWCI (FIGS. 10A-10C) samples. Pore size data does not conclusively explain the difference either, though the bimetallic sample was observed to have a larger pore diameter by about 1 nm. Analysis of $SiO_2$ substrates with varying pore size could clarify if pore blocking plays a role. The presence of NiO clearly is a significant factor and could contribute by lowering the activation energy for adsorption or for the $Cu_2O$ to CuO oxidation reaction.

Figure 11A:
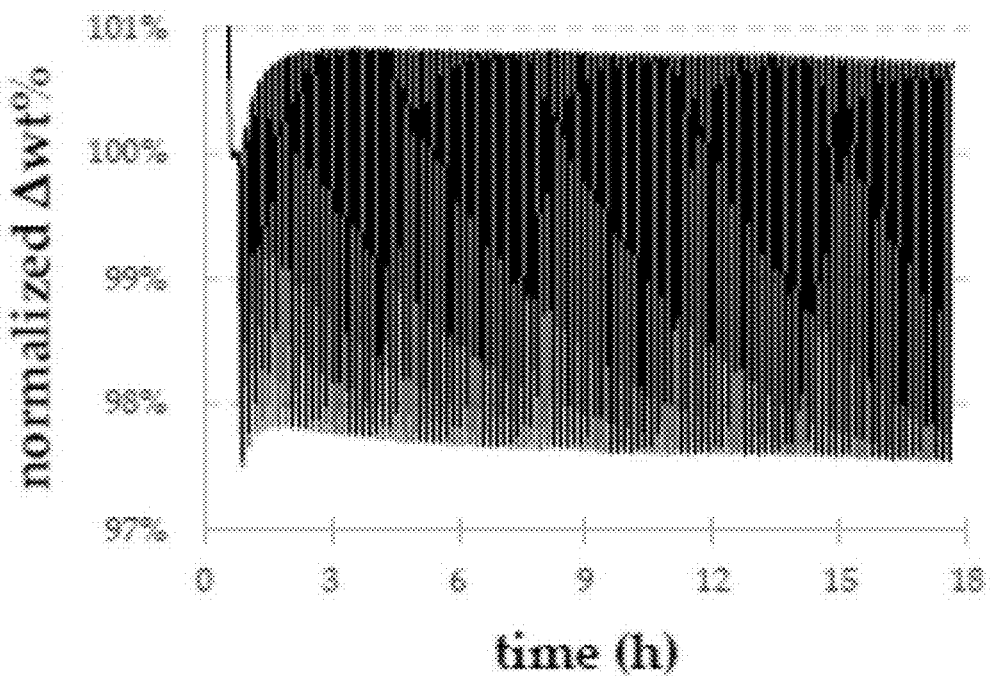
FIG. 11A shows the recorded TGA weight change for SAWCI-33-$SiO_2$ over 100 cycles at 950° C.
Figure 11B:
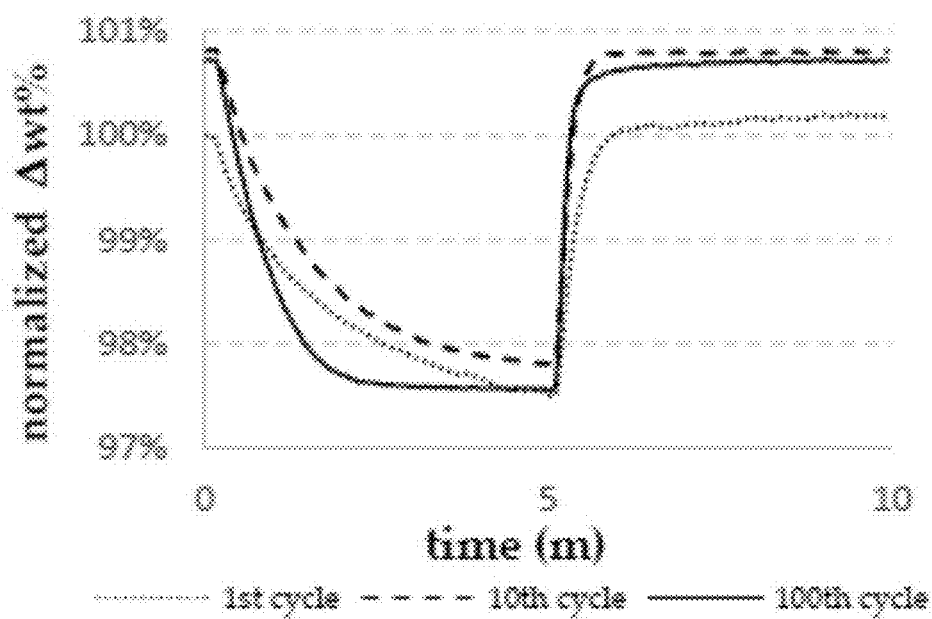
FIG. 11B is a detail of FIG. 11A showing decomposition and oxidation for SAWCI-33-$SiO_2$ at the selected TGA cycles.
Figure 11C:
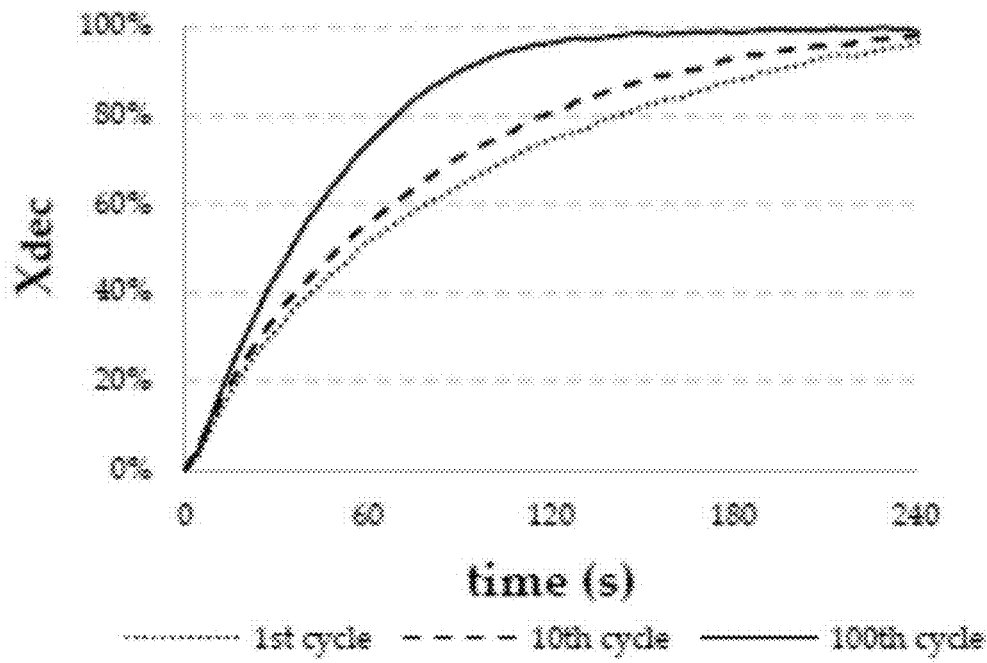
FIG. 11C shows TGA decomposition conversion curves for SAWCI-33-$SiO_2$ at selected cycles at 950° C.
Figure 11D:
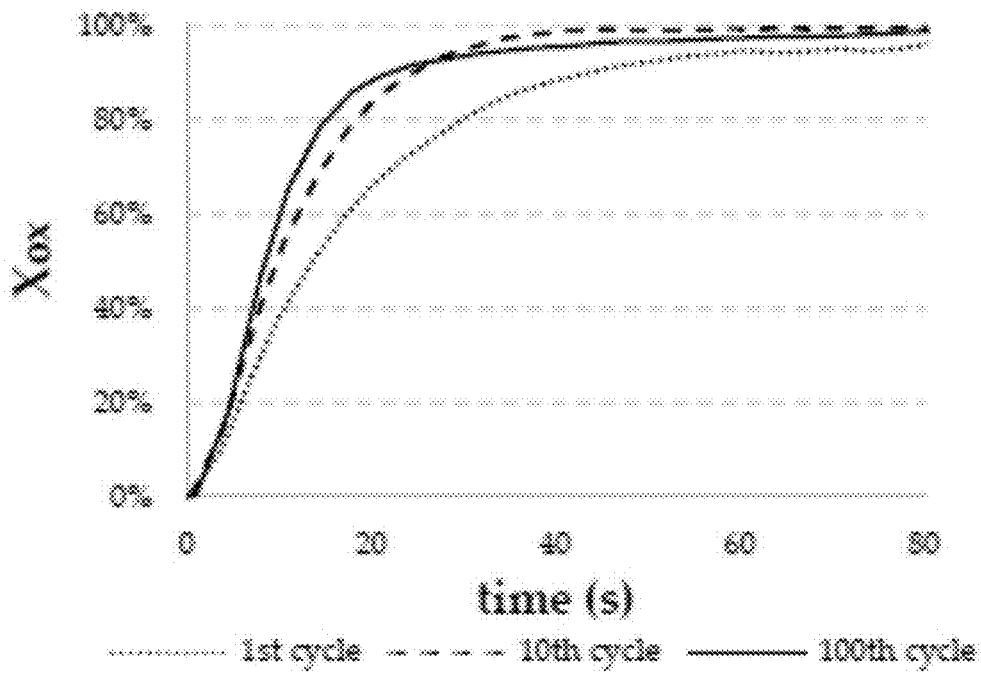
FIG. 11D shows TGA oxidation conversion curves for SAWCI-33-$SiO_2$ at selected cycles at 950° C.

TGA was used to analyze the reactivity of the OC SAWCI-33-$SiO_2$ over 100 redox cycles. FIG. 11A shows excellent cyclability over the 100-cycle test ($Cu_2O$/CuO cycling) with no apparent deactivation. The OC material exhibited fast and complete decomposition and oxidation during the entire 16 hours of TGA operation. According to FIG. 11B, conversion rates over the multi-hour test increase with time (i.e. cycle number). Conversion curves in FIGS. 11C and 11D show decomposition and oxidation curves, respectively. As shown in FIG. 11C, the decomposition rate was slower than oxidation, but increased substantially with cycling. Near complete conversion was reached under 2 minutes after 16 hours of cycling at 950° C. As shown in FIG. 11D, complete conversion from $Cu_2O$ to CuO was reached in about 40 seconds after 100 cycles. The longevity of the SAWCI-33-$SiO_2$ indicates it is a promising material for chemical looping applications.

In conclusion, a survey of several impregnation methods has been performed in order to identify the most promising methods for scalable preparation of CuO-based oxygen carriers for chemical looping technologies. Commercially available SiC and $SiO_2$ support materials were investigated. For the purposes of pilot-scale manufacture of Cu-based oxygen carriers, the selective adsorption wet co-impregnation (SAWCI) method was identified to have the greatest potential and was explored further. Co-impregnation with NiO promoted the oxidation of $Cu_2O$ to CuO. Selective adsorption increased the metal-support interaction between Cu and the $SiO_2$ support, resulting in a reduced crystallite size. SEM/EDS analysis has shown good dispersion and small CuO crystallites throughout the porous $SiO_2$ sphere allowed high resistance to sintering. For 33 wt % CuO on $SiO_2$ support, fluidization tests cycling between $Cu_2O$ and CuO did not show any signs of agglomeration, even at 975° C. Long TGA cycling has shown increasing reaction rates and no drop in oxygen transport capacity over 100 cycles.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for making a chemical looping oxygen carrier, the method comprising:
    contacting a support with an aqueous solution comprising two or more metal ammine complexes using wet impregnation;
    selectively adsorbing the two or more metal ammine complexes onto a porous support; and
    thermally converting the two or more metal ammine complexes to two or more metal oxides.

2. The method of claim 1 wherein the two or more metal oxides are present in the oxygen carrier in an amount greater than approximately 20 wt %.

3. The method of claim 2 wherein the two or more metal oxides are present in the oxygen carrier in an amount greater than or equal to approximately 33 wt %.

4. The method of claim 3 wherein the two or more metal oxides are present in the oxygen carrier in an amount greater than approximately 40 wt %.

5. The method of claim 1 wherein the support comprises an oxide.

6. The method of claim 5 wherein the oxide comprises $SiO_2$ $Al_2O_3$, $TiO_2$, or $ZrO_2$.

7. The method of claim 1 wherein the support is porous, macroporous, mesoporous, microporous, or nanoporous.

8. The method of claim 7 comprising approximately uniformly dispersing each of the two or more metal oxides on the porous support and within pores of the porous support.

9. The method of claim 1 wherein the thermally converting step comprises nitrate decomposition.

10. The method of claim 1 further comprising drying the wet impregnated support and subsequently washing the dried support with water prior to the thermally converting step.

11. The method of claim 1 wherein at least one of the two or more metal ammine complexes comprises a transition metal, and the at least one metal ammine complex is thermally converted into a transition metal oxide.

12. The method of claim 1 wherein one of the metal ammine complexes comprises tetraammine copper nitrate (TACN) and the TACN is thermally converted into CuO.

13. The method of claim 12 wherein one of the metal ammine complexes comprises hexaammine nickel nitrate (HANN) and the HANN is thermally converted into NiO.

14. The method of claim 12 wherein the aqueous solution comprises a molar ratio of 1 mol Ni/99 mol Cu.

15. The method of claim 14 wherein the oxygen carrier comprises 40 wt. % CuO and 0.4 wt. % NiO.

* * * * *